United States Patent
Lee et al.

(10) Patent No.: US 8,718,177 B2
(45) Date of Patent: *May 6, 2014

(54) OPTIMAL LINEAR EQUALIZER FOR MIMO SYSTEMS WITH HARQ AND/OR REPETITION CODING

(71) Applicant: Marvell World Trade Ltd., St. Michael (BB)

(72) Inventors: Jungwon Lee, San Diego, CA (US); Hui-Ling Lou, Sunnyvale, CA (US); Woong Jun Jang, Seoul (KR)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,117

(22) Filed: Feb. 25, 2013

(65) Prior Publication Data
US 2013/0163657 A1    Jun. 27, 2013

Related U.S. Application Data

(63) Continuation of application No. 11/834,466, filed on Aug. 6, 2007, now Pat. No. 8,411,778.

(60) Provisional application No. 60/821,772, filed on Aug. 8, 2006.

(51) Int. Cl.
*H04B 7/02*    (2006.01)

(52) U.S. Cl.
USPC ........... 375/267; 375/260; 375/262; 375/341; 375/347; 370/203; 370/208; 370/210; 370/328; 370/329; 370/332; 370/333; 370/334

(58) Field of Classification Search
USPC .......... 375/260, 262, 267, 341, 347; 370/203, 370/208, 210, 328–329, 332–334
See application file for complete search history.

(56) References Cited

U.S. PATENT DOCUMENTS

| | | | |
|---|---|---|---|
| 6,185,258 | B1 | 2/2001 | Alamouti |
| 6,567,388 | B1 | 5/2003 | Tomcik et al. |
| 6,687,492 | B1 | 2/2004 | Sugar et al. |
| 6,778,619 | B2 | 8/2004 | Zangi et al. |

(Continued)

FOREIGN PATENT DOCUMENTS

| | | |
|---|---|---|
| EP | 1 271 835 | 1/2003 |
| EP | 1 501 210 | 1/2005 |

(Continued)

OTHER PUBLICATIONS 802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

(Continued)

*Primary Examiner* — Daniel Washburn
*Assistant Examiner* — Eboni Hughes

(57) ABSTRACT

Systems and methods are provided for decoding signal vectors in multiple-input multiple-output (MIMO) systems, where the receiver has received one or more signal vectors based on the same transmitted vector. The symbols of the received signal vectors are combined, forming a combined received signal vector that may be treated as a single received signal vector. The combined received signal vector may be equalized by, for example, a zero-forcing or minimum-mean-squared error equalizer or another suitable linear equalizer. Following equalization, the equalized signal vector may be decoded using a simple, linear decoder.

20 Claims, 22 Drawing Sheets

(56) References Cited

U.S. PATENT DOCUMENTS

| | | | |
|---|---|---|---|
| 6,868,520 | B1 | 3/2005 | Fauconnier |
| 6,892,341 | B2 | 5/2005 | Golitschek et al. |
| 6,967,598 | B2 | 11/2005 | Mills |
| 7,031,419 | B2 | 4/2006 | Piirainen |
| 7,194,237 | B2 | 3/2007 | Sugar et al. |
| 7,295,624 | B2 | 11/2007 | Onggosanusi |
| 7,308,026 | B2 | 12/2007 | Purho |
| 7,308,047 | B2 | 12/2007 | Sadowsky |
| 7,362,815 | B2 | 4/2008 | Lindskog et al. |
| 7,366,247 | B2 | 4/2008 | Kim et al. |
| 7,382,841 | B2 | 6/2008 | Ohtaki et al. |
| 7,386,079 | B2 | 6/2008 | Skog et al. |
| 7,428,269 | B2 | 9/2008 | Sampath |
| 7,489,746 | B1 | 2/2009 | Awater et al. |
| 7,502,432 | B2 | 3/2009 | Catreux et al. |
| 7,526,038 | B2 | 4/2009 | McNamara |
| 7,539,274 | B2 | 5/2009 | Catreux et al. |
| 7,548,592 | B2 | 6/2009 | Wight |
| 7,554,985 | B2 | 6/2009 | Ihm et al. |
| 7,567,583 | B2 | 7/2009 | Miyoshi |
| 7,573,806 | B2 | 8/2009 | Ihm et al. |
| 7,590,204 | B2 | 9/2009 | Monsen |
| 7,593,489 | B2 | 9/2009 | Koshy et al. |
| 7,649,953 | B2 | 1/2010 | Bauch |
| 7,693,551 | B2 | 4/2010 | Ojard |
| 7,729,411 | B2 | 6/2010 | Wang et al. |
| 7,742,550 | B2 | 6/2010 | Olesen et al. |
| 7,751,506 | B2 | 7/2010 | Niu et al. |
| 7,782,971 | B2 | 8/2010 | Burg et al. |
| 7,885,364 | B2 | 2/2011 | Ito |
| 8,085,738 | B2 | 12/2011 | Park et al. |
| 8,279,966 | B2 | 10/2012 | Lee et al. |
| 8,320,509 | B2 | 11/2012 | Lee et al. |
| 8,379,743 | B2 | 2/2013 | Bury |
| 8,411,778 | B1 * | 4/2013 | Lee et al. ............... 375/267 |
| 8,498,195 | B1 | 7/2013 | Lee et al. |
| 2003/0185295 | A1 | 10/2003 | Yousef |
| 2004/0181419 | A1 | 9/2004 | Davis et al. |
| 2005/0226239 | A1 | 10/2005 | Nishida et al. |
| 2006/0107167 | A1 | 5/2006 | Jeong et al. |
| 2006/0165192 | A1 | 7/2006 | Ito |
| 2006/0251156 | A1 | 11/2006 | Grant et al. |
| 2006/0274836 | A1 | 12/2006 | Sampath et al. |
| 2007/0155433 | A1 | 7/2007 | Ito et al. |
| 2007/0206531 | A1 | 9/2007 | Pajukoski et al. |
| 2007/0254662 | A1 | 11/2007 | Khan et al. |
| 2007/0268988 | A1 * | 11/2007 | Hedayat et al. ............ 375/347 |
| 2007/0291882 | A1 | 12/2007 | Park et al. |
| 2008/0025427 | A1 | 1/2008 | Lee et al. |
| 2008/0025429 | A1 | 1/2008 | Lee et al. |
| 2008/0025443 | A1 | 1/2008 | Lee et al. |
| 2008/0037670 | A1 | 2/2008 | Lee et al. |
| 2008/0049865 | A1 | 2/2008 | Blankenship et al. |
| 2008/0063103 | A1 | 3/2008 | Lee et al. |
| 2008/0144733 | A1 | 6/2008 | ElGamal et al. |
| 2008/0159375 | A1 | 7/2008 | Park et al. |
| 2008/0198941 | A1 | 8/2008 | Song et al. |
| 2009/0031183 | A1 | 1/2009 | Hoshino et al. |
| 2009/0080579 | A1 | 3/2009 | Fujii |
| 2009/0252236 | A1 | 10/2009 | Li et al. |
| 2009/0307558 | A1 | 12/2009 | Lee et al. |
| 2010/0014601 | A1 | 1/2010 | Mo et al. |
| 2013/0083836 | A1 | 4/2013 | Lee et al. |

FOREIGN PATENT DOCUMENTS

| | | |
|---|---|---|
| EP | 1 608 081 | 12/2005 |
| WO | WO 00/52873 | 9/2000 |
| WO | WO 02/067491 | 8/2002 |

OTHER PUBLICATIONS

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Alamouti, Siavash, M. "A Simple Transmit Diversity Technique for Wireless Communications." IEEE Journal on Select Areas in Communications, vol. 16, No. 8. (Oct. 1998).

Arkhipov, Alexander et al. "OFDMA-CDM Performance Enchancement by Combining H-ARQ and Interference Cancellation" IEEE Journal on Selected Areas in Communications, vol. 24, No. 6, pp. 1199-1207 (Jun. 2006).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Cioffi, John et al. "Generalized decision-feedback equalization for packet transmission with ISI and gaussian noise", Communications, computation, control and signal processing: a tribute to Thomas Kailath, pp. 79-127 (1997).

Davis, Linda M. "Scaled and Decoupled Cholesky and QR Decompositions with Application to Spherical MIMO Detection" IEEE Wireless Communications and Networking, vol. 1, pp. 326-331 (2003).

Dekorsy, Armin "A Cutoff Rate based Cross-Layer Metric for MIMO-HARQ Transmission" IEEE 16th Internal Symposium on Personal, Indoor and Mobile Radio Communications, vol. 4, pp. 2166-2170 (2005).

Gharavi-Alkhansari, Mohammad et al. "Constellation Space Invariance of Space-Time Block Codes with Application to Optimal Antenna Subset Selection" Signal Processing Advances in Wireless Communications, pp. 269-273 (2003).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for BLAST", IEEE International Conference on Acoustics, Speech, and Signal Processing, vol. 2, pp. 737-740 (2000).

Jang et al. "An Efficient Symbol-Level Combining Scheme for MIMO Systems With Hybrid ARQ", IEEE Transactions on Wireless Communications, vol. 8, pp. 2443-2451, May 26, 2009.

Jang et al., "Optimal Combining Schemes for MIMO Systems with Hybrid ARQ", ISIT 2007, IEEE International Symposium, Jun. 24-Jun. 29, 2007, pp. 2286-2290.

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." *IEEE VTC*. Sep. 2006.

Liu, Peng et al. "A New Efficient MIMO Detection Algorithm based on Cholesky Decomposition," The 6th International Conference on Advanced Communication Technology, vol. 1, pp. 264-268 (2004).

Nagareda R et al. "OFDM mobile packet transmission system with multiuser detection and metric combining ARQ" Vehicular Technology Conference, 2004 VTC2004—Fall. 2004 IEEE 60th Los Angeles, CA USA, pp. 709-713 (Sep. 26, 2004).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Nakajima, Akinori et al. "Throughput of Turbo Coded Hybrid ARQ Using Single-carrier MIMO Multiplexing" IEEE 61st Vehicular Technology Conference, vol. 1, pp. 610-614 (2005).

Oh, Mi-Kyung et al. "Efficient Hybrid ARQ with Space-Time Coding and Low-Complexity Decoding" IEEE Conference on Acoustics, Speech, and Signal Processing, vol. 4, pp. 589-592 (2004).

(56) References Cited

OTHER PUBLICATIONS

Onggosanusi, Eko N. et al. "Hybrid ARQ Transmission and Combining for MIMO systems" *IEEE*, 2003.
Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).
Samra H; Zhi Ding "New MIMO ARQ protocols and joint detection via sphere decoding" IEEE Transactions on Signal Processing [online] Feb. 28, 2006, pp. 473-482.
Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).
Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).
Theofilakos, Panagiotis et al. "Frobenius Norm Based Receive Antenna Subarray Formation for MIMO Systems" First European Conference on Antennas and Propagation, pp. 1-5 (2006).
Tirkkonen, O et al. "Square-Matrix Embeddable Space-Time Block Codes for Complex Signal Constellations," IEEE Trans. Info. Theory, vol. 48, pp. 384-395 (Feb. 2002).
Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).
Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).
Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.
Wübben, Dirk et al. "MMSE Extension of V-BLAST based on Sorted QR Decomposition" IEEE 58th Vehicular Technology Conference, vol. 1, pp. 508-512 (2003).
Zhou, S. et al., Subspace-Based (Semi-) Blind Channel Estimation for Block Precoded Space-Time OFDM, IEEE Transactions on Signal Processing, vol. 50, No. 5, May 2002, pp. 1215-1228.
Zhang, Y. et al. "MMSE Linear Detector for Space-Time Transmit Diversity over Fast Fading Channels", The $14^{th}$ IEEE 2003 International Symposium on Personal, Indoor and Mobile Radio Communication Proceedings, pp. 2388-2392, 2003.

\* cited by examiner $$\begin{bmatrix} y_1 \\ \vdots \\ y_{N_r} \end{bmatrix}_i = \begin{bmatrix} h_{11} & \cdots & h_{1N_t} \\ \vdots & \ddots & \vdots \\ h_{N_r 1} & \cdots & h_{N_r N_t} \end{bmatrix}_i \begin{bmatrix} x_1 \\ \vdots \\ x_{N_t} \end{bmatrix} + \begin{bmatrix} n_1 \\ \vdots \\ n_{N_r} \end{bmatrix}_i$$

$$\mathbf{y}_i = H_i \mathbf{x} + \mathbf{n}_i$$

FIG. 5

$$\underbrace{\begin{bmatrix} y_1 \\ \vdots \\ y_{N_r} \end{bmatrix}_1 \cdots \mathbf{y}_N}_{(NN_r \times 1)} = \underbrace{\begin{bmatrix} h_{11} & \cdots & h_{1N_t} \\ \vdots & \ddots & \vdots \\ h_{N_r 1} & \cdots & h_{N_r N_t} \end{bmatrix}_1 \cdots H_N}_{(NN_r \times N_t)} \underbrace{\mathbf{x}}_{(N_t \times 1)} + \underbrace{\begin{bmatrix} n_1 \\ \vdots \\ n_{N_r} \end{bmatrix}_1 \cdots \mathbf{n}_N}_{(NN_r \times 1)}$$

FIG. 15

OPTIMAL LINEAR EQUALIZER FOR MIMO SYSTEMS WITH HARQ AND/OR REPETITION CODING

CROSS-REFERENCE TO RELATED APPLICATIONS

This application is a continuation of U.S. patent application Ser. No. 11/834,466, filed Aug. 6, 2007 (currently pending), which claims the benefit under 35 U.S.C. §119(e) of U.S. Provisional Application No. 60/821,772, filed Aug. 8, 2006, which are incorporated herein by reference in their entireties.

BACKGROUND OF THE INVENTION

This invention relates to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.).

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, it would be desirable to provide a system or method for effectively utilizing information from an arbitrary number of transmitted packets that does not drastically increase the complexity of the system.

SUMMARY OF THE INVENTION

Accordingly, systems and methods for reliable transmission in multiple-input multiple-output systems are disclosed, where a receiver obtains multiple signal vectors from the same transmit signal and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

In one embodiment of the present invention, when the receiver has N≥1 received signal vectors corresponding to a common transmit signal vector, the receiver combines the signals of the received signal vectors, which each include information about common transmit symbols. This technique is referred to as symbol-level combining. The signal vectors may be combined by weighted addition of the signals. In some embodiments, the weights may be chosen to maximize the signal-to-noise ratio at the receiver. The combined signal vector may be treated as a single received vector, affected by some channel, represented by a combined channel response matrix, and some noise components, referred to as the combined noise vector.

Accordingly, the combined signal vector may be equalized using a suitable technique for equalizing a single received signal vector. For example, the combined signal vector may be equalized using a zero-forcing (ZF) or minimum-mean-squared error (MMSE) equalizer, or any other suitable linear equalizer. The resulting, processed combined received signal vector may then be decoded. Because of the equalization, a suitable decoder for decoding the processed combined signal vector can be a linear decoder. That is, the suitable decoder may only grow linearly in complexity as the size of the received signal vector increases. Thus, the decoder may have relatively low complexity.

In some embodiments, such as when an ARQ or HARQ protocol is used, the multiple receptions of signal vectors from a common transmit signal vector may occur in distinct time intervals. Therefore, the receiver may include a storage system to store intermediate values of the combined received signal vector and the combined channel response matrix at each time interval. After a new signal vector is received by the receiver, the newly received signal vector may be combined with a stored intermediate combined signal vector from the previous time interval to create a new combined signal vector. Therefore, a new combined signal vector may be obtained without re-computing information associated with previously received signal vectors. Similarly, the channel response matrix associated with a newly received signal vector may be combined with a stored intermediate channel response matrix to create an updated version of the combined channel response matrix. The newly calculated combined received signal vector and combined channel matrix may be stored by overwriting the previously stored values in the storage system.

It can be shown that the MRC-based symbol-level combining receiver with linear equalization and decoding can be considered an optimal linear receiver. That is, the MRC-based receiver may fully utilize all received information from a common transmit signal vector. In particular, the decoding metric for the ZF and MMSE receivers may be equivalent to the decoding metric of a receiver that uses a different, optimal type of combining called concatenation-assisted symbol-level (CASL) combining. A CASL combining receiver merely concatenates the received signal vectors to create the combined received signal vector. Therefore, all of the received signal vectors are unchanged and fully utilized. Thus, the CASCL combining receiver is clearly optimal. Because it may be shown that the decoding metric of the CASCL combining receiver is equivalent to the decoding metrics for MRC receivers, the MRC receivers may also be optimal.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

FIG. 15 shows a vector model of the concatenated system of FIG. 14.

DETAILED DESCRIPTION OF THE INVENTION

The disclosed invention provides a technique in a multiple-input multiple-output data transmission or storage system to decode a signal vector at a receiver, where the receiver may receive multiple signal vectors from the same transmitted signal vector.

Figure 1:
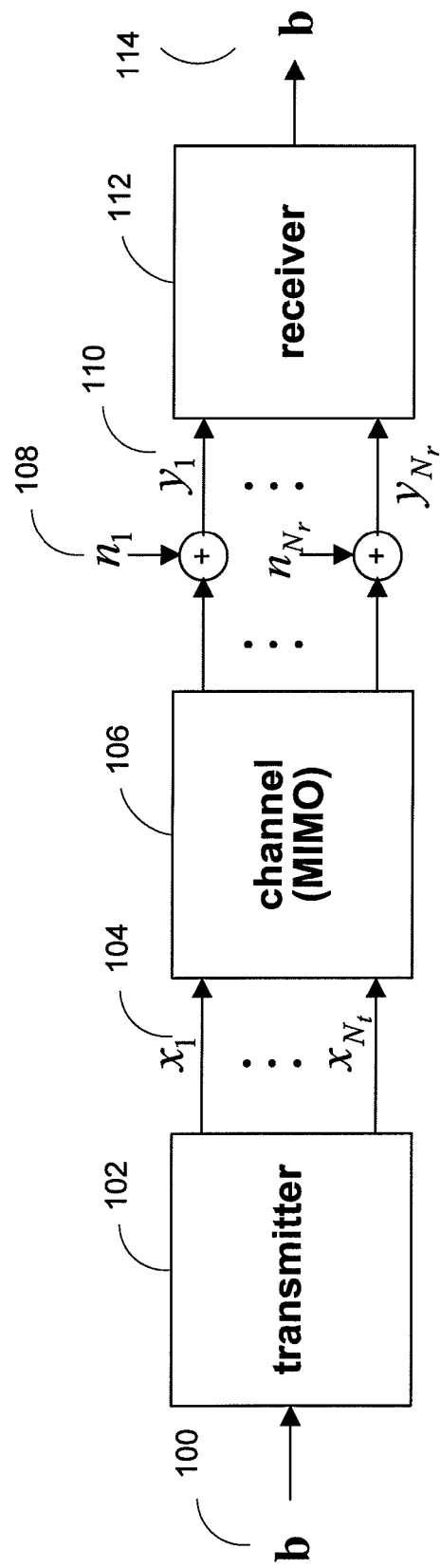
FIG. 1 is a high level block diagram of a multiple-input multiple-output data transmission or storage system.

FIG. 1 shows an illustration of a basic data transmission or storage system in accordance with one embodiment of the present invention. Data, typically grouped into packets, can be sent from transmitter 102 to receiver 112. During transmission, the signals may be altered by a transmission medium, represented by channel 106, and additive noise sources 108. Transmitter 102 can have $N_t$ outputs 104 and receiver 112 can have $N_r$ inputs 110, so channel 106 can be modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
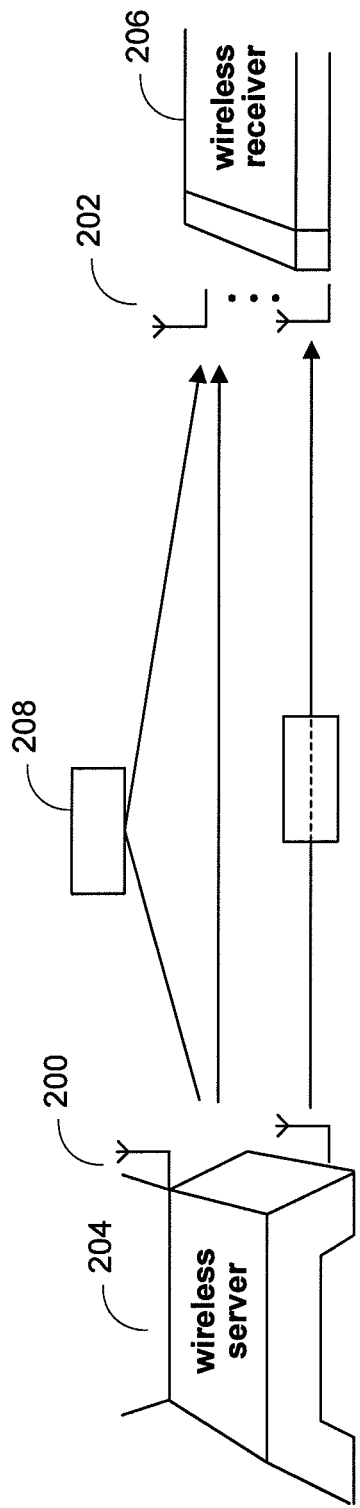
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 can be a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
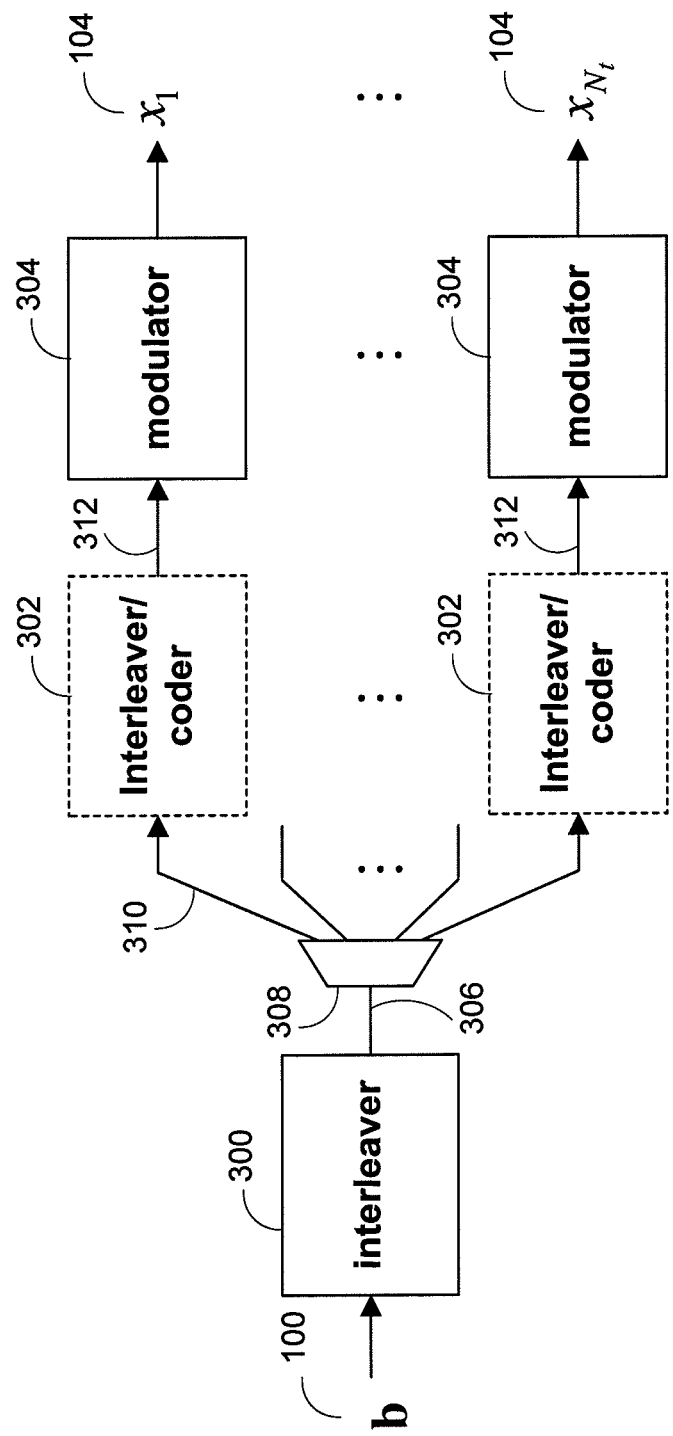
FIG. 3 is a block diagram of a transmitter.

One embodiment of transmitter 102 is shown in FIG. 3. Transmitter 102 converts bit sequence 100 into signals 104 appropriate for transmission through channel 106 (FIG. 1). Bit sequence 100 may be passed through interleaver 300. Therefore, each bit in bit sequence 100 may be assumed to be independent of all other bits in bit sequence 100. Bit sequence 306 at the output of interleaver 300 can be demultiplexed by demultiplexer 308 across $N_t$ paths 310. Each demultiplexed output 310 may or may not go through another interleaver and/or coding block 302, yielding bit sequences 312. Finally, bit sequences 312 are modulated with modulators 304, and are transmitted as signals $x_{N_t}$, or x in vector form.

Figure 4A:
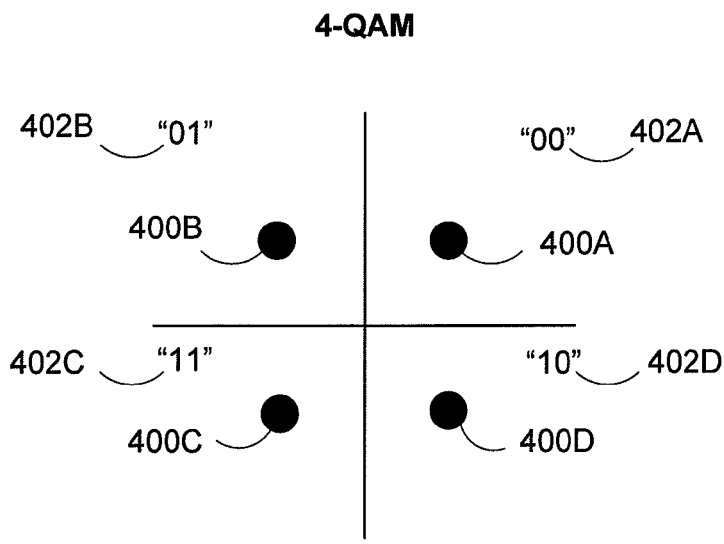
FIG. 4A is a signal constellation set for quadrature amplitude modulation with four signal points.

Modulators 304 can group the incoming bits into symbols, which may be mapped and converted to signals according to a signal constellation set and carrier signal. In one embodiment, modulator 304 uses quadrature amplitude modulation (QAM). In this embodiment, each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10." However, any other one-to-one mapping from symbol to signal point may be used.

Figure 4B:
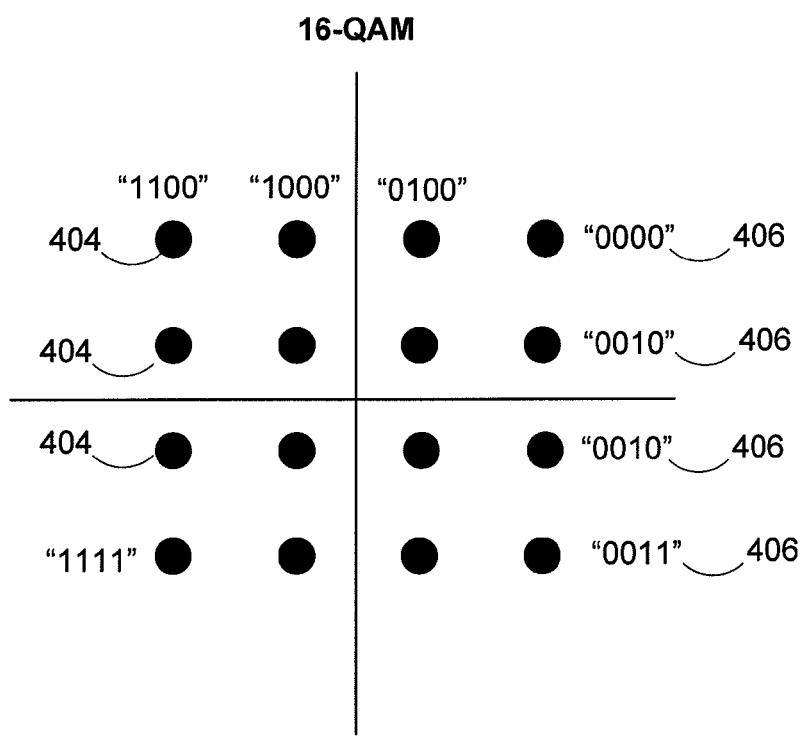
FIG. 4B is a signal constellation set for quadrature amplitude modulation with 16 signal points.

FIG. 4B shows a 16-QAM signal constellation set, where four-bit sequences 406 can be combined into one symbol. Here, both the amplitudes and the phase of signal points 404 may vary. FIG. 4B shows a partial mapping from symbols 406 to signal points 404, where each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting $mN_t$ bits concurrently.

In accordance with one embodiment, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may include a buffer to store x, or equivalently bit stream 100, in the event that a retransmission is requested.

Even though x is transmitted, receiver 112 in FIG. 1 may actually receive $y_i$, where $$y_i = Hx + n_i, \quad 1 \le i \le N \tag{1}$$

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. $n_i$ is an $N_r \times 1$ vector of additive noise. Note that the characteristics of channel 106, reflected in matrix 500, and noise sources 108, and therefore received signal 110, may be different for each instance i. Differences can arise because each transmission of x occurs at a different time or through a different medium.

In one embodiment, noise sources 108 may be modeled by receiver 112 as additive white Gaussian noise (AWGN) sources. In this embodiment, noise sources 108 are independent and identically distributed (i.i.d). That is, the noise that affects any of the $N_r$ components in any $n_i$ does not affect the noise for any other component in $n_i$, and each component has the same characteristics at any given time. Furthermore, each component of $n_i$ may be assumed to have zero mean and be random in terms of both magnitude and phase, where the magnitude and the phase are also independent. This type of noise source may be referred to as an i.i.d. zero mean circularly symmetric complex Gaussian (ZMCSCG) noise source. If the variance of each component is $N_0$, then the conditional probability distribution function (pdf) of the received signal, $\Pr\{y|x,H\}$, can be given by $$\Pr\{y \mid x, H\} = \frac{1}{(\pi N_0)^N} \exp\left\{-\frac{\|y - Hx\|^2}{N_0}\right\} \tag{2}$$

Equation (2) will be used with reference to maximum-likelihood decoding discussed in greater detail below in connection with FIG. 10.

Receiver 112 of FIG. 1 may use one or more of the N received copies of x to determine the information that was transmitted, and may output an estimate of the transmitted information at output 114. Receiver 112 may combine multiple received vectors into a single vector for decoding, thereby utilizing more than one, and possibly all, of the transmitted signal vectors. The combining scheme will be discussed in greater detail below in connection with FIGS. 7-11. It should be understood that the receiver may combine all received signal vectors. Alternatively, a subset of the received signal vectors and channel matrices may be combined. For example, a received signal and the corresponding channel matrix may be discarded if the magnitude of a component in the received signal vector is below a certain threshold. Thus, the variable N can refer to the number of received signal vectors used by the receiver, which is not necessarily the same as the number of total signal vectors received.

Figure 6A:
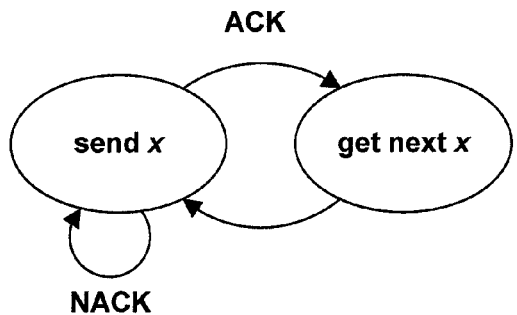
FIG. 6A is a flow diagram of a stop-and-wait HARQ transmitter.
Figure 6B:
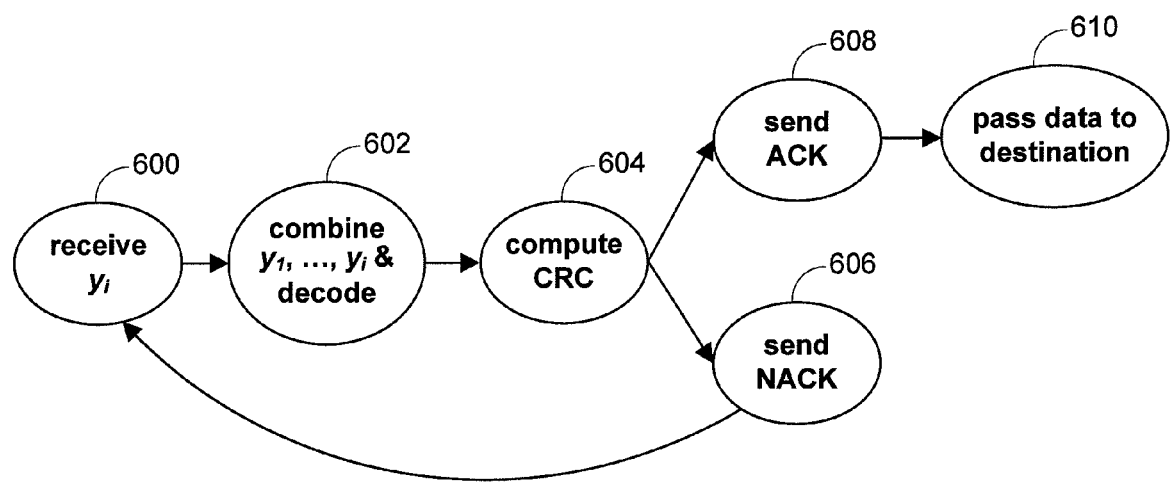
FIG. 6B is a flow diagram of a HARQ receiver.

In one embodiment, receiver 112 can receive multiple instances of a common transmit vector using a retransmission protocol. For example, the transmitter and receiver may use a HARQ type-I protocol. The flow chart of the steps taken by transmitter 102 and receiver 112 are shown in FIG. 6A and FIG. 6B, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one aspect of the invention. At some time, receiver 112 can receive $y_i$ at step 600, corresponding to the ith transmission of x. At step 602, receiver 112 may combine any of the vectors corresponding to transmitted signal x received thus far, that is $y_1, \ldots, y_i$, into a single vector, ỹ, and may decode the combined vector or a processed version of the combined vector. In FIG. 6B, decoding refers to determining the CRC-protected message based on the combined signal vector. Other possible decoding outputs will be discussed in greater detail below in connection with FIG. 7. Errors in individual signal vectors may be corrected by combining the received signal vectors such that the combined signal vector, ỹ, is correctable by decoding. Following decoding, error detection is performed at step 604, which in this case involves checking the CRC of the decoded vector. If errors are detected, the receiver may send a negative acknowledgement (NACK) message to the transmitter at step 606. Upon receipt of the NACK, the transmitter may send the same transmitted signal vector, which is received at step 600 as $y_{i+1}$. $y_{i+1}$ may be different from $y_i$ even though the same transmit signal vector x is used at the transmitter, because $y_{i+1}$ is transmitted at a later time than $y_i$ and can be affected by different noise and/or channel characteristics. The 1+1 vectors are combined and decoded, as described previously. This procedure occurs until N signal vectors are received and combined, and the combined vector can be decoded such that no CRC error is detected. At this point, the receiver may send an acknowledgment (ACK) message at step 608 back to the transmitter to inform the transmitter that the vector has been successfully received. Also, since there are no errors in the decoded data, the receiver can pass the decoded data to the destination at step 610.

In another embodiment, the transmitter (e.g., transmitter 102 of FIG. 1) can send a signal vector, x, a fixed number of times, irrespective of the presence of errors. For example, the receiver may obtain N transmissions of x from repetition coding. N copies of x may be transmitted simultaneously, or within some interval of time. The receiver (e.g., receiver 112 of FIG. 1) can combine signal vectors, $y_1, \ldots, y_N$, and may decode the combination or a processed version of the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that multiple vectors are received at step 600 before combining and decoding at step 602. The invention, however, is not limited to the two protocols and their combination mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Figure 7:
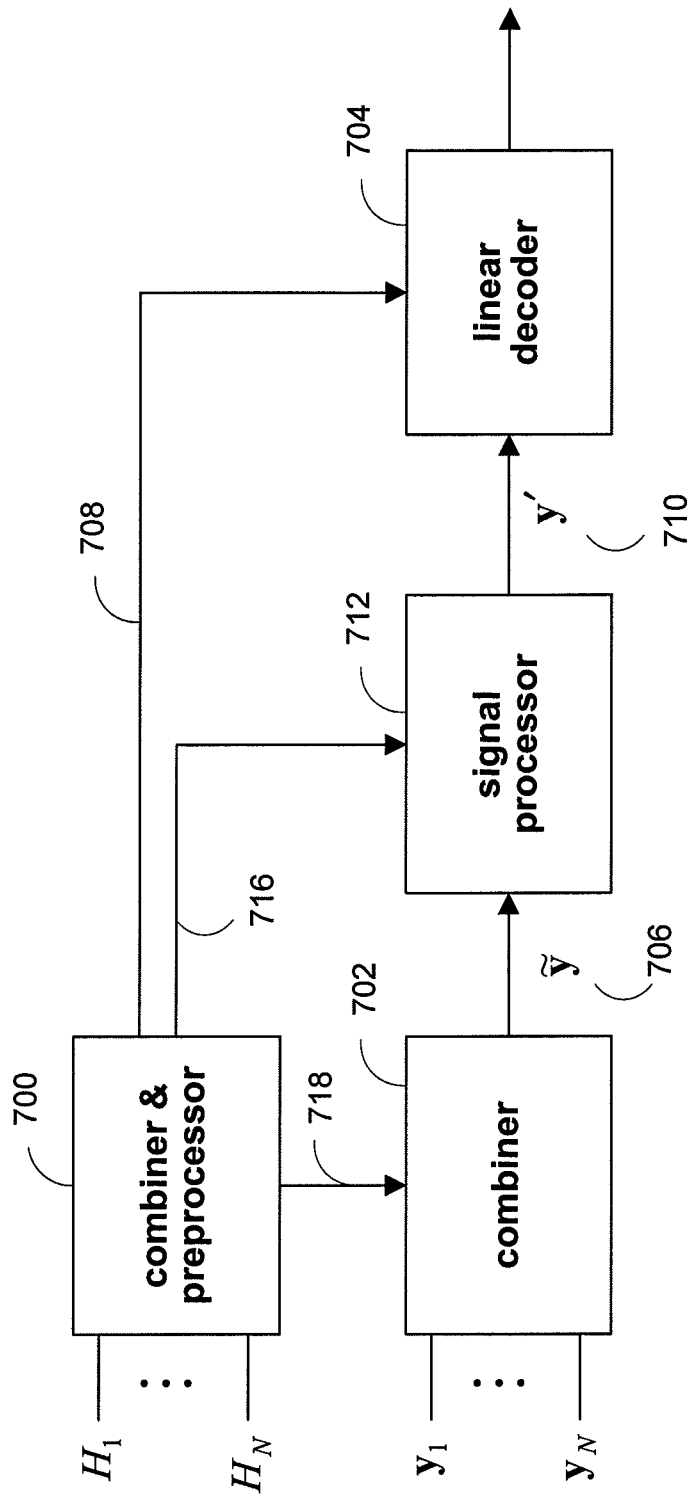
FIG. 7 is a high level block diagram of a receiver.

FIG. 7 is a simplified block diagram of one embodiment of a receiver (e.g., receiver 112 of FIG. 1) in accordance with one aspect of the present invention. Furthermore, it illustrates one way to implement combining and decoding at step 602 in FIG. 6B. Combiner 702, which may or may not use channel information 718 provided from channel combiner 700, can combine the signals of the N received vectors using any suitable combining technique. This type of combining is hereinafter referred to as symbol-level combining, because the combiner operates on signals of the signal vector, where each signal at a given time can represent a symbol of information. Combined received vector 706, ỹ, can be passed through signal processor 712. Signal processor 712 can process the combined received vector to produce a processed signal vector 710, y'. ỹ may be processed in a way such that the resulting signal vector, y', may be decoded by a linear decoder. That is, the complexity of the decoder may increase only linearly with the size of the received signal vector, and may therefore have low complexity. Thus, signal processor 712 may be considered a linear equalizer, and decoder 704, which may decode the processed signal vector, may be referred to as a linear decoder.

With continuing reference to FIG. 7, decoder 704 may compute an estimate of the transmit signal vector from the processed combined signal vector, y', and may use channel information 708 provided by combiner 700 to obtain this estimate. Decoder 704 may return soft information or hard information. If decoder 704 returns soft information, decoder 704 may compute the soft metrics based on channel information (e.g., the combined channel matrix). As discussed below in connection with FIG. 10, this may allow for soft information to be computed according to the signal-to-noise ratio (SNR) of the received signals. Thus, the reliability of the soft information may be maximized. In other embodiments, if decoder 704 returns hard information, it may have been the result of hard-decoding or mapping from soft-decoding. For a coded system, decoder 704 may return coded information or decoded information.

In some embodiments, the output of decoder 704 may be fed into another decoder for decoding an error correcting or detecting code (not shown). In particular, if decoder 704 outputs soft information, the soft information may be decoded by a soft decoder (e.g., an LDPC decoder). Alternatively, if decoder 704 outputs hard information, the hard information may be decoded by a hard decoder (e.g., Reed-Solomon decoder). Accordingly, the output of decoder 704, or another output derived from the output of decoder 704, may be provided as the output of the overall receiver (e.g., output 114 of receiver 112 in FIG. 1).

Figure 8:
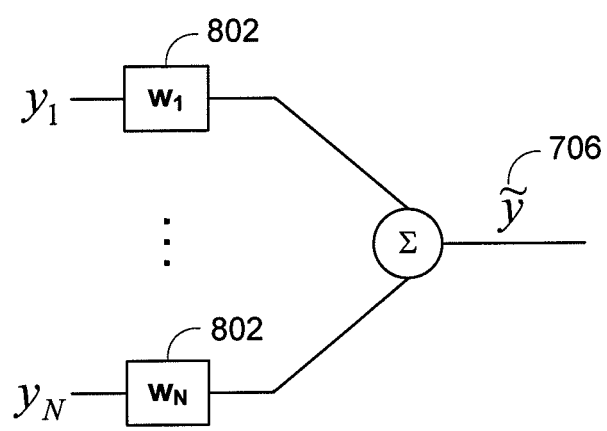
FIG. 8 shows an embodiment of a symbol-level combiner for a single input, single output (SISO) system.

Single-input single-output (SISO) systems are a special case of MIMO systems in which $N_t=N_r=1$. FIG. 8 shows an embodiment of a combiner (e.g., combiner 702 of FIG. 7) for a SISO system. First, the signals are combined by weighted addition. Weights 702 may be chosen to maximize SNR, a technique called maximal ratio combining (MRC). To maximize the SNR, the weights may be chosen such that each weight is proportional to the channel gain for the corresponding received signal. That is, $w_1$ would be proportional to the channel gain, $h_1$, for received signal $y_1$. Thus, for MRC or other weighted addition combining, the weights (e.g., weights 702) may be functions of channel information obtained from a channel preprocessor (e.g., preprocessor 700).

Figure 9:
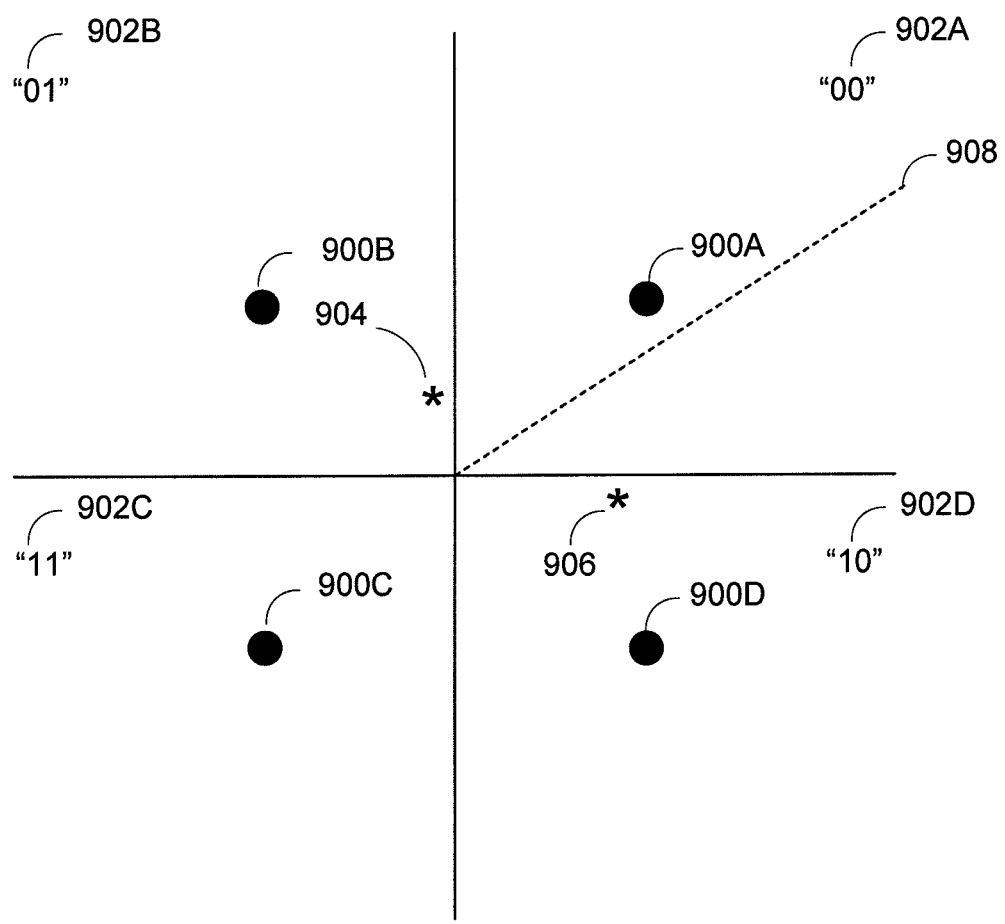
FIG. 9 is an example of symbol-level combining in a 4-QAM system using weighted addition.

FIG. 9 shows an example of a weighted addition combining HARQ receiver of the configuration shown in FIG. 7 for a SISO system. The signal constellation set shows a 4-QAM scheme, which was described above in connection with FIG. 4A. Signal points 900A-900D represent the magnitude and phase of a transmitted symbol. For illustration purposes, assume that the transmitter is sending the symbol, "00" (902A), to the receiver using a HARQ type-I protocol. Assume, again for the purpose of illustration, that the channel does not attenuate, amplify, or alter the signal in any way. Thus, $h_i=1$ for each of the N inputs to the symbol combiner. Therefore, ideally, a signal representing this symbol with the magnitude and phase of signal point 900A would be received. However, due to additive noise, a signal with the magnitude and phase of point 904 may actually be received. If the combined signal vector is not processed in any way by signal processor 712, it will be incorrectly decoded as "01," because it is closer to signal point 900B than 900A. Note that an ML decoder may make this decision if the noise is assumed to be AWGN. The error-detecting code may then detect the presence of the bit error, resulting in a request for a retransmission. On the second transmission, a signal with the magnitude and phase of point 906 may be received. If signal point 906 is decoded on its own, it may be incorrectly decoded as "10." However, by weighted addition of signal points 904 and 906, the resulting combined signal may fall approximately on dotted line 908. The combined signal point is now closest to signal point 900A and will be decoded correctly as "00." Thus, the combining scheme shown in FIG. 8 may be used to effectively combine multiple signals for decoding.

Figure 10:
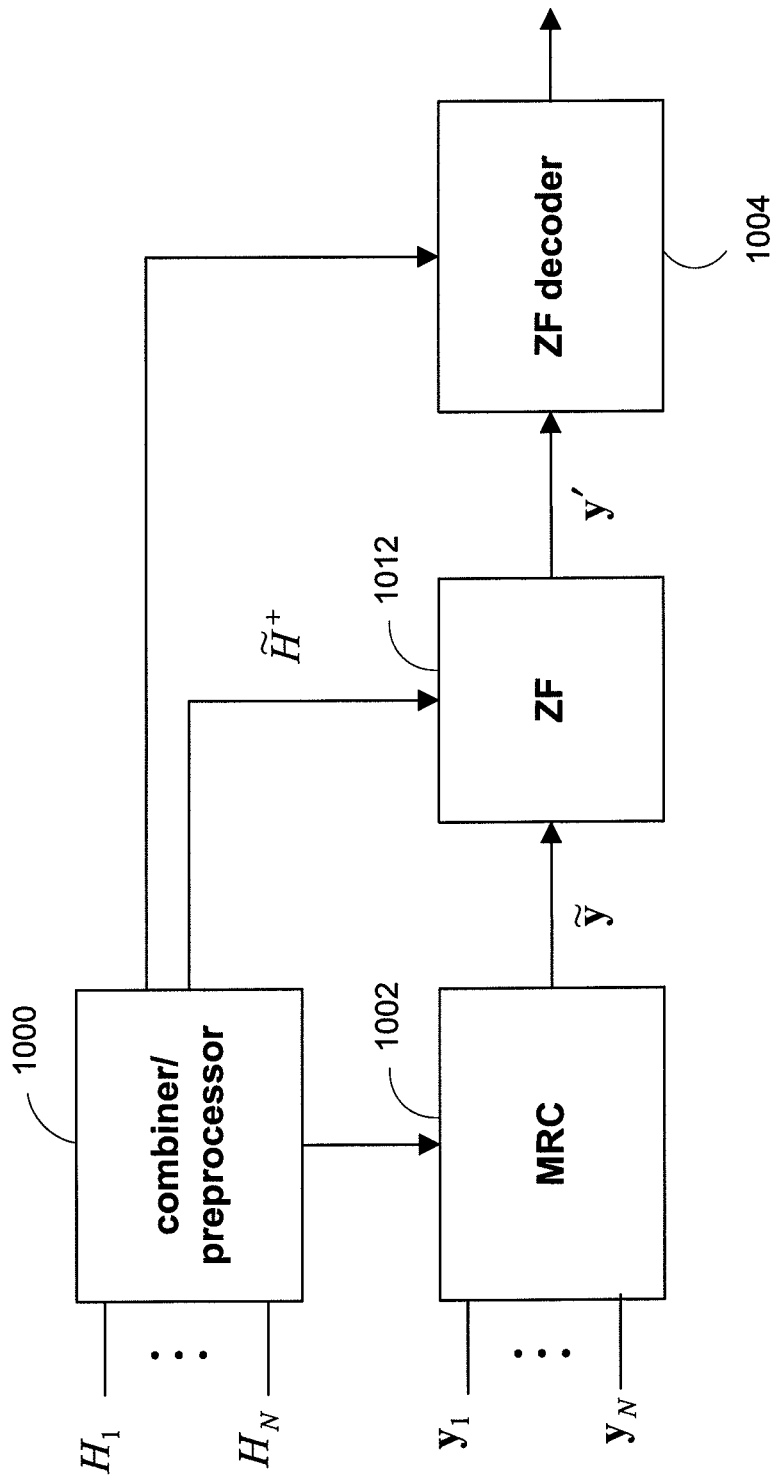
FIG. 10 shows a detailed embodiment of FIG. 7 for a MIMO system.

FIG. 10 shows an illustrative block diagram for a symbol-level combining receiver in a MIMO system. FIG. 10 is a detailed view of one embodiment of the receiver configuration shown in FIG. 7, and can be implemented in receiver 112 of FIG. 1. Combiner 1002 may combine N received signal vectors by weighted addition. In one embodiment of the present invention, the resulting combined received signal vector may be, $$\tilde{y} = H_1^* y_1 H_2^* y_2 + \ldots H_N^* y_N \quad (3)$$

$$= (H_1^* H_1 + H_2^* H_2 + \ldots H_N^* H_N) x + \tilde{n} \quad (4)$$

$$= \tilde{H} x + \tilde{n} \quad (5)$$

where $$\tilde{H} = \sum_{i=1}^{N} H_i^* H_i \quad \text{and} \quad \tilde{n} = \sum_{i=1}^{N} H_i^* n_i.$$

$\tilde{H}$ is an $N_t \times N_t$ matrix referred to hereinafter as the combined channel matrix, and may be calculated by combiner/preprocessor 1000. $\tilde{n}$ is an $N_t \times 1$ noise vector hereinafter referred to as the combined noise vector. Here, the weights in equations (30) and (31) are chosen to maximize the SNR. Although the term, maximal ratio combining (MRC), is typically used for SISO systems, for simplicity, it will also be used herein to refer to a symbol-level, MIMO combining scheme that maximizes the SNR. Therefore, the embodiment described here is an MRC MIMO receiver. Following the combination, equation (5) shows that the combined received signal vector may be modeled as a single received vector, $\tilde{y}$, affected by channel $\tilde{H}$ and noise components $\tilde{n}$.

The combined signal vector $\tilde{y}$, may then be equalized using zero-forcing (ZF) equalizer 1012. Zero-forcing is a technique used to ideally eliminate the effect of a channel, H, from a received vector, y, by multiplying the received vector by the channel inverse, $H^{-1}$. The result is generally a signal vector similar to the transmitted signal vector, but with correlated and amplified noise. Because y may be modeled as a single received signal vector, zero-forcing equalizer 1012 may multiply the received signal vector by the inverse of the combined channel matrix, or $\tilde{H}^{-1}$. After the processing, the resulting signal vector, y' may be given by, $$y' = \tilde{H}^{-1} \tilde{y} \quad (6)$$

$$= x + n', \quad (7)$$

where $n' = \tilde{H}^{-1} \tilde{n}$. The covariance of n', or $E\{n' n'^*\}$ is equal to the inverse of the combined channel matrix, $\tilde{H}^{-1}$. Therefore, from equation (7), the processed combined signal vector may be modeled as a single received signal vector, y', received from a common transmit signal vector x, and affected by only additive, correlated noise n'. For a MIMO system where the combined channel matrix is $N_r \times N_t$, and $N_r$ may be different than $N_t$, the true inverse of the combined channel matrix, $\tilde{H}$, may not exist. Therefore, it should be understood that zero-forcing equalizer 1012 may multiply the combined received signal vector with the pseudo-inverse of $\tilde{H}$, $\tilde{H}^+ = (\tilde{H}^* \tilde{H})^{-1} \tilde{H}^*$ rather than a true inverse, $\tilde{H}^{-1}$.

Figure 11A:
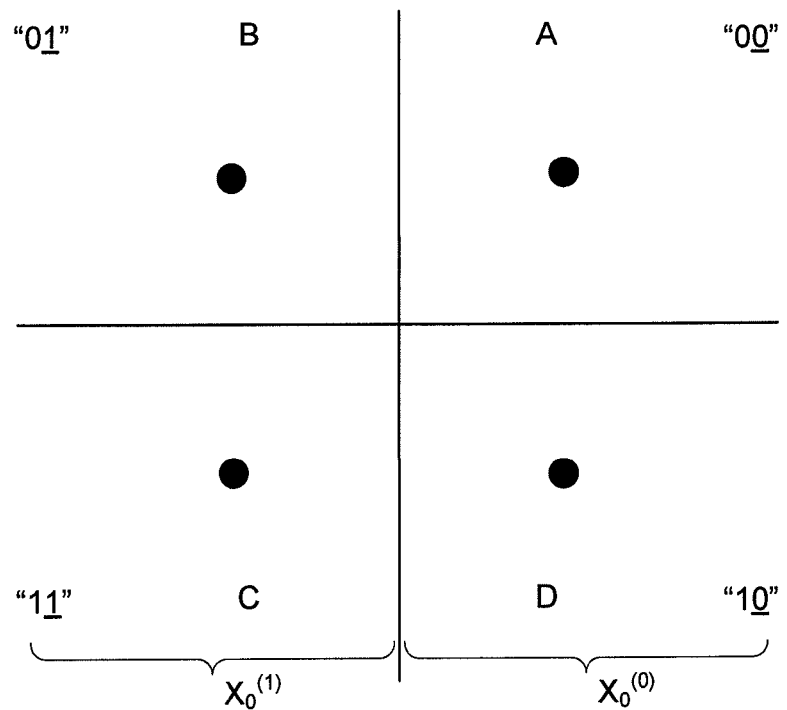
FIGS. 11A-11B show subsets of signal points in a 4-QAM signal constellation set.
Figure 11B:
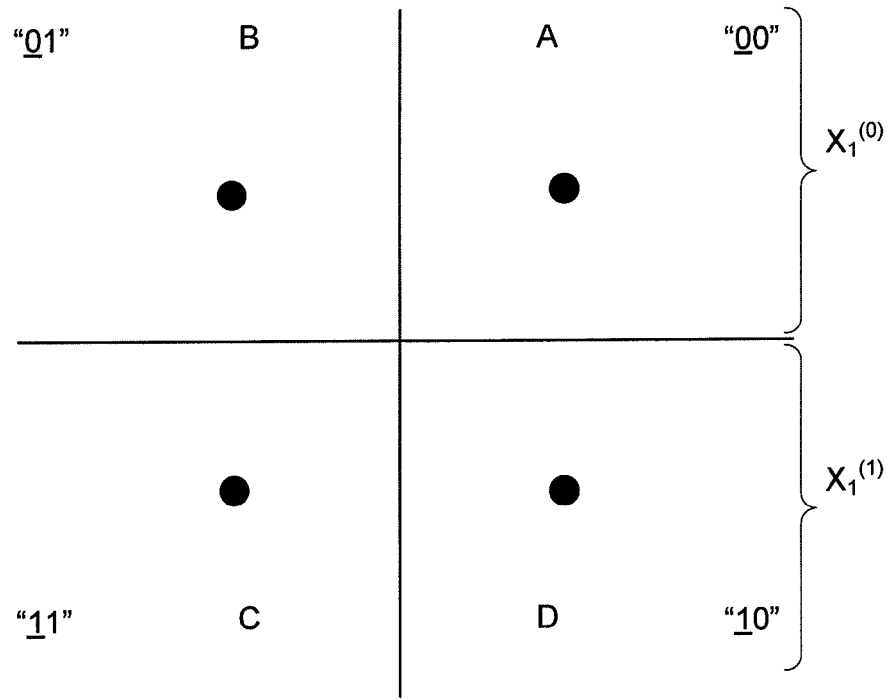

The variance of the noise component, n', of the combined received signal vector, y', is not necessarily a diagonal matrix. Therefore, the components of n' may be correlated. However, this correlation may be ignored, and y' may be directly decoded by decoder 1004. By directly decoding y', and because of the effect of zero-forcing, decoder 1004 may be a linear decoder, and may therefore be relatively low in complexity. Decoder 1004 may output any suitable estimate for x, such as a hard output, a soft output, etc. One type of soft estimate that decoder 1004 may compute is a log-likelihood ratio (LLR). An LLR is a soft-bit metric where the sign of the LLR indicates the most likely value of the transmitted bit (most likely '1' if positive, most likely '0' if negative), and the magnitude of the LLR indicates the strength or confidence of the decision. To calculate the LLR for each bit in the transmit sequence, $b_\lambda$, decoder 1004 may compute, $$\frac{1}{[\tilde{H}^{-1}]_{k,k}} \left\{ \min_{[\hat{x}^{(0)}]_k \in X_\lambda^{(0)}} |[y']_k - [\hat{x}^{(0)}]_k|^2 - \min_{[\hat{x}^{(1)}]_k \in X_\lambda^{(1)}} |[y']_k - [\hat{x}^{(1)}]_k|^2 \right\}, \quad (8)$$

which will be derived below in equations (9) through (14). Thus, the most complex calculation performed by decoder 1004 may be calculating $$\frac{|[y']_k - [\hat{x}]_k|^2}{[\tilde{H}^{-1}]_{k,k}},$$

which is hereinafter referred to as the decoding metric for a zero-forcing decoder. $[\hat{x}]_k$ represents a possible signal for a symbol in the common transmit signal that includes $b_\lambda$. Thus, $[\hat{x}]_k$ includes information about the $$\left( \left\lfloor \frac{\lambda - 1}{m} \right\rfloor + 1 \right)^{th}$$

symbol in the transmit sequence. The subscript, k, indicates the kth component in a vector and subscript (k,k) indicates the (k,k)th component in a matrix. The variable $X_\lambda^{(j)}$ in equation (6) denotes a subset of the signal constellation set whose $\lambda^{th}$ bit equals j for j=0,1 For example, FIGS. 11A and 11B illustrate the four possible subsets for a 4-QAM signal constellation set. 4-QAM is discussed in greater detail above in connection with FIG. 4A. In each figure, the $\lambda^{th}$ bit is underlined for emphasis. Note that, as is consistent with the definition of the subset, the emphasized bit is the same for all members of a subset. Therefore, for $b_\lambda = 1$ (FIG. 11B), $[\hat{x}^{(0)}]_k \in X_\lambda^{(0)}$ in equation (6) would include signal points in quadrants A and B, and $[\hat{x}^{(1)}]_k \in X_\lambda^{(1)}$ would include signal points in quadrants C and D.

As shown in equation (8), each component, k, of the decoding metric may be scaled by channel information, represented by the factor, $$\frac{1}{[\tilde{H}^{-1}]_{k,k}}.$$

Thus, each component may be weighted proportionally to channel gain. As discussed above in connection with FIG. 8, this form of weighting may maximize SNR, and may therefore maximize the performance of decoding. Therefore, using the processing techniques of FIG. 10, the performance of both the combining step at combiners 1000 and 1002 and the decoding step at decoder 1004 can be maximized. Therefore, the overall performance of the system of FIG. 10 may be high or even optimal for a ZF decoding scheme. The optimality of this scheme will be described below in connection with FIG. 14.

One valuable aspect of equation (8) is that $|[y']_k - [\hat{x}]_k|^2$ is a symbol-by-symbol calculation. That is, rather than treating the entire transmit vector, $\hat{x}$, only the kth component is determined in any given calculation.

Thus, decoder 1004, which computes equation (8), may have relatively low complexity. In comparison, a maximum-likelihood (ML) decoder, a type of non-linear decoder, computes $\|y - H\hat{x}\|^2$. This is a vector-by-vector calculation, and may require significantly more calculations, each of larger size and/or complexity. Furthermore, unlike a ZF decoder, an ML decoder may need to utilize the channel characteristics. Accordingly, the receiver block diagram of FIG. 10 may advantageously have both high performance and low complexity.

Equation (8), the LLR equation computed by decoder 1004, may be calculated as follows, $$LLR_{ZF} = L(b_\lambda | y', \tilde{H}^{-1}) \quad (9)$$

$$= \ln \frac{Pr\{b_\lambda = 1 | y', \tilde{H}^{-1}\}}{Pr\{b_\lambda = 0 | y', \tilde{H}^{-1}\}} \quad (10)$$

$$= \ln \frac{Pr\{y' | b_k = 1, \tilde{H}^{-1}\}}{Pr\{y' | b_k = 0, \tilde{H}^{-1}\}} \quad (11)$$

$$\cong \ln \frac{\sum_{[\hat{x}^{(1)}]_k \in X_\lambda^{(1)}} Pr\{[y']_k | [\hat{x}^{(1)}]_k, [\tilde{H}^{-1}]_{k,k}\}}{\sum_{[\hat{x}^{(0)}]_k \in X_\lambda^{(0)}} Pr\{[y']_k | [\hat{x}^{(0)}]_k, [\tilde{H}^{-1}]_{k,k}\}} \quad (12)$$

$$\cong \ln \frac{\max_{[\hat{x}^{(1)}]_k \in X_\lambda^{(1)}} Pr\{[y']_k | [\hat{x}^{(1)}]_k, [\tilde{H}^{-1}]_{k,k}\}}{\max_{[\hat{x}^{(0)}]_k \in X_\lambda^{(0)}} Pr\{[y']_k | [\hat{x}^{(0)}]_k, [\tilde{H}^{-1}]_{k,k}\}} \quad (13)$$

$$= \frac{1}{[\tilde{H}^{-1}]_{k,k}} \Big\{ \min_{[\hat{x}^{(0)}]_k \in X_\lambda^{(0)}} |[y']_k - [\hat{x}^{(0)}]_k|^2 - \min_{[\hat{x}^{(1)}]_k \in X_\lambda^{(1)}} |[y']_k - [\hat{x}^{(1)}]_k|^2 \Big\}, \quad (14)$$

Equations (9) and (10) follow from the definition of the LLR. Equation (11) is reached by applying Bayes' Theorem, a technique known in the art, to equation (10). Then, equation (12) ignores the correlation between noise components, and looks only at each k and (k,k)th component individually.

Also, equation (12) is written in terms of transmitted symbols, represented by $\hat{x}$, instead of transmitted bits, $b_k$. For example, in the numerator of equation (9), the probability that $b_0 = 1$ is the sum of the probabilities that the transmitted symbol was "01" or "11" for a 4-QAM system. As shown in FIG. 10A, "01" and "11" is subset $X_0^1$. Therefore, $Pr\{y' | b_0 = 1, \tilde{H}^{-1}\}$ (equation (11)) is equivalent to $$\sum_{x^{(1)} \in X_0^1} Pr\{y' | \hat{x}^{(1)}, \tilde{H}^{-1}\}. \quad \text{(equation (12))}$$

Finally, equation (13) utilizes the approximation, $\Sigma_i \log a_i \approx \log \max_i a_i$, and equation (14) results from plugging in equation (2) for the condition probabilities. Recall that equation (2) is the conditional probability distribution function (PDF) for an AWGN channel.

The receiver configuration of FIG. 10 shows all N received vectors and N channel response matrices as inputs into their respective combining blocks. However, all N signal vectors and N channel matrices are not necessarily given to the combining blocks at the same time, and the receiver is not required to wait until after all N signal vectors are received to begin operating. Instead, the receiver of FIG. 10 merely illustrates that the system is capable of combining information from all N transmissions of a common transmit signal vector in any suitable manner. In fact, in some embodiments, such as when a HARQ protocol is used, the combiners may only need to accept one signal vector or channel matrix at any given time, and information on the previous transmissions may be obtained from some other suitable source.

Figure 12:
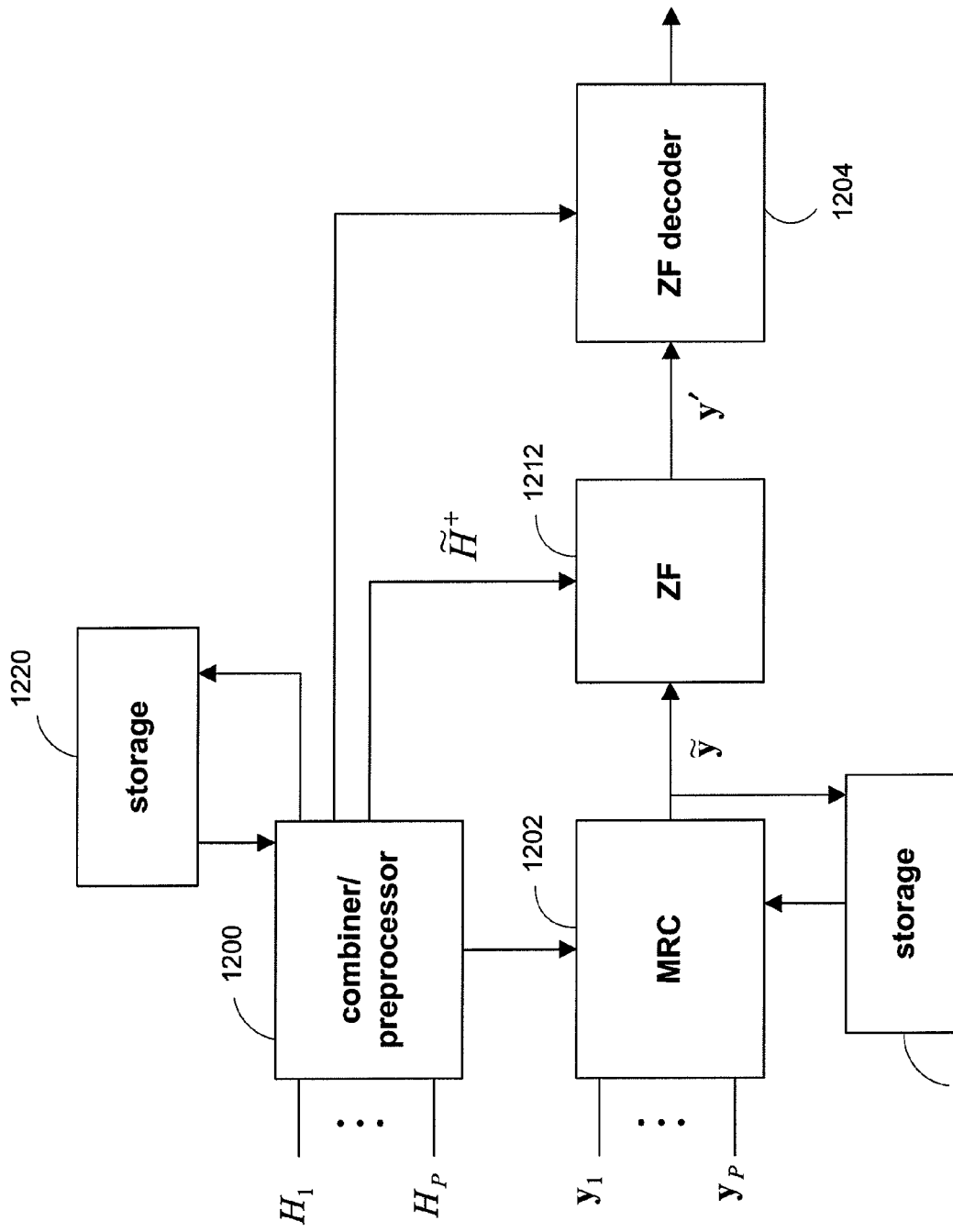
FIGS. 12-14 show more detailed embodiments of FIG. 7 for a MIMO system.

FIG. 12 shows a more detailed receiver of FIG. 10 that illustrates how a receiver may operate when N signal vectors are received in groups or distinct time intervals. The variable P, where P≤N, is hereinafter defined to be the number of signal vectors that are received substantially at the same time (e.g., concurrently, within a given amount of time, etc.). Thus, for a HARQ or ARQ protocol, P may be equal to one. For repetition coding or another suitable fixed transmission scheme, P may be equal to N. For other suitable protocols, 1<P<N. For simplicity, it is assumed that P is divisible by N. In this scenario, there are a total of P/N transmissions of P signal vectors. The present invention, however, is not limited to this constrained situation. Also, for clarity, subscripts on any combined vectors or matrices will refer to the number of vectors or matrices included in the combination. For example, $\tilde{y}_i$ may refer to a combined received signal vector for a combination of received vectors $y_1, \ldots, y_i$ or $y_{i+1}, \ldots, y_{2i}$, etc.

When a first set of P signal vectors is received by the system in FIG. 12, no previous information about the common transmit signal vector may be available. Therefore, combiners 1200 and 1202 may calculate the combined received vector, $\tilde{y}_P$, and the combined channel matrix, $\tilde{H}_P$, for the P signal vectors, respectively. The values of $\tilde{y}_P$ and $\tilde{H}_P$ may be stored in storage 1222 and 1220, respectively, for future use. Although storage 1220 and 1222 are shown to be separate in FIG. 12, they may also be a single storage system. Combiner/preprocessor 1200 can additionally calculate $\tilde{H}_P^{-1}$ or $\tilde{H}_P^+$ using $\tilde{H}_P$. ZF equalizer 1212 and decoder 1204 can then decode for the common transmit signal based on the information available in the P received signal vectors.

When a second set of P signal vectors is received, combiners 1200 and 1202 may combine the newly received signal vectors with the information for the first set of signal vectors stored in storage 1220 and 1222. That is, combiner 1202 may calculate $\tilde{y}_P$ for the second set of P signal vectors, and may add them to the combined vector that has already been calculated. Similarly, combiner 1200 may calculate $\tilde{H}_P$ for the second set of P channel matrices, if they are different than the first set, and may add them to the combined channel matrix that has already been calculated. If the channel matrices are the same as for the first transmission, combiner 1200 may simply utilize the information obtained from the previous calculations. Thus, combiners 1200 and 1204 may obtain combined signal vectors and combined channel matrices for the first 2P signal vectors ($\tilde{y}_{2P}$ and $\tilde{H}_{2P}$), respectively, without re-computing information obtained from previous transmissions. Mathematically, combiners 1200 and 1202 may compute:

$$\tilde{y}_{2P} = \sum_{i=1}^{2P} H_i^* y_i = \tilde{y}_P + \sum_{j=P+1}^{2P} H_j^* y_j \quad (15)$$

$$\tilde{H}_{2P} = \sum_{i=1}^{2P} H_i^* H_i = \tilde{H}_P + \sum_{j=P+1}^{2P} H_j^* H_j \quad (16)$$

$\tilde{y}_{2P}$ and $\tilde{H}_{2P}$ may be stored in storage 1222 and 1220, respectively, by overwriting $\tilde{y}_P$ and $\tilde{H}_P$ that was stored after the first transmission. $\tilde{y}_{2P}$ and $\tilde{H}_{2P}$ may then be recalled from storage and utilized when a third set of P signal vectors are received.

Using the storage systems shown in FIG. 12, a receiver may incrementally change its combined received vector and combined channel matrix as new sets of signal vectors are received. After each set of P signal vectors is received, decoder 1204 can produce a high quality estimate of the common transmit signal vector for the given number signal vectors that have been received. Thus, the effectiveness of the receiver does not depend on the number of received vectors. This is particularly useful for certain transmission protocols, such as HARQ, where he number of received signal vectors may vary.

Another benefit illustrated by the receiver configuration in FIG. 12, and may be true of any of the other embodiments of the present invention (e.g., FIGS. 7 and 10), is decoder reusability for an arbitrary N. That is, only one decoder is implemented no matter how many signal vectors are received. Using a separate decoder for each N would drastically increase both the amount and complexity of the hardware. In addition, since it would be impractical and impossible to implement a different decoder for all N≥1, the decoding flexibility of the receiver would be limited. Therefore, it may be highly beneficial, in terms of decoder complexity and flexibility, that the receiver configurations shown in FIGS. 7 and 10 may implement a single decoder for arbitrary N.

Another benefit of the receiver configuration in FIG. 12 is memory efficiency. After each set of P signal vectors is received, a new combined signal vector, $\tilde{y}$, can be calculated. This signal vector may replace the previous information stored in memory. Therefore, the memory requirement of storage 1220 and 1222 does not depend on the number of received vectors. In particular, storage 1200 may be just large enough to store one copy of $\tilde{H}$, and storage 1202 may be just large enough to store one copy of $\tilde{y}$. This is in contrast to a system that re-computes $\tilde{y}$ and $\tilde{H}$ each time a new set of vectors is received. In this scenario, the receiver would need to save the signal vectors and channel response matrices for all previous transmissions.

Figure 13:
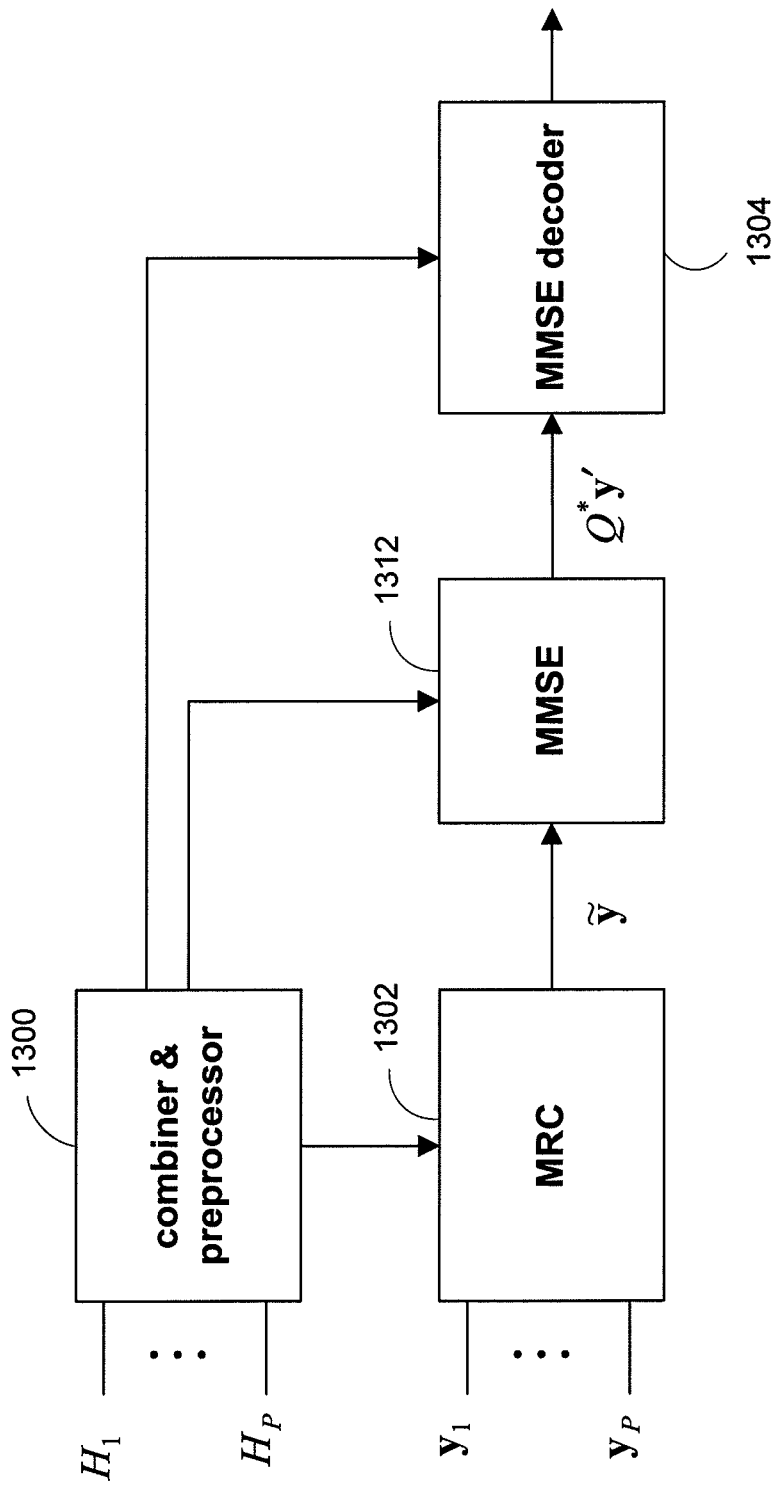

FIG. 13 shows another embodiment of a receiver with the configuration shown in FIG. 7. Although storage systems, such as those of FIG. 12, are not explicitly shown, they may be assumed to be part of combiners 1300 and 1302, respectively. The receiver in FIG. 13 uses a minimum-mean-squared error (MMSE) equalizer. An MMSE equalizer is another equalizer that attempts to recover the originally transmitted signal prior to decoding the signal vector. Thus, after the received signal vectors are combined into a combined signal vector, $\tilde{y}$, MMSE equalizer 1312 may process $\tilde{y}$ by multiplying the combined signal vector by $p(p\tilde{H}+N_0I)^{-1}$, where p is a vector of the MMSE equalizer tap weights, $N_0$ is the power spectral density of the noise, and I is the identity matrix. The resulting processed signal vector, y', may then be decoded by a linear decoder, MMSE decoder 1304. Decoder 1304 may return hard or soft information. If decoder 1304 returns soft information, it may be in the form of an LLR derived in a similar fashion as the ZF LLR equations shown in equations (9) through (14). Therefore, both the combining and decoding steps of this receiver configuration may advantageously utilize channel information to maximize the performance of its respective functions.

The ZF and MMSE receiver configurations shown in FIGS. 10, 12, and 13 may be effective for decoding a common transmit signal vector based on multiple transmissions of the common transmit signal vector. In fact, the ZF and MMSE receivers may fully utilize information from all received signal vectors, and may process them in a manner that maximizes SNR at each processing step. Thus, the ZF and MMSE receivers are considered optimal linear receivers. Accordingly, the performance of the ZF and MMSE receivers may be shown to equal the performance of another type of receiver that is clearly capable of optimally using all received signal vectors. This receiver is shown in FIG. 14, and is referred to as a concatenated-assisted symbol-level (CASL) combining receiver.

Figure 14:
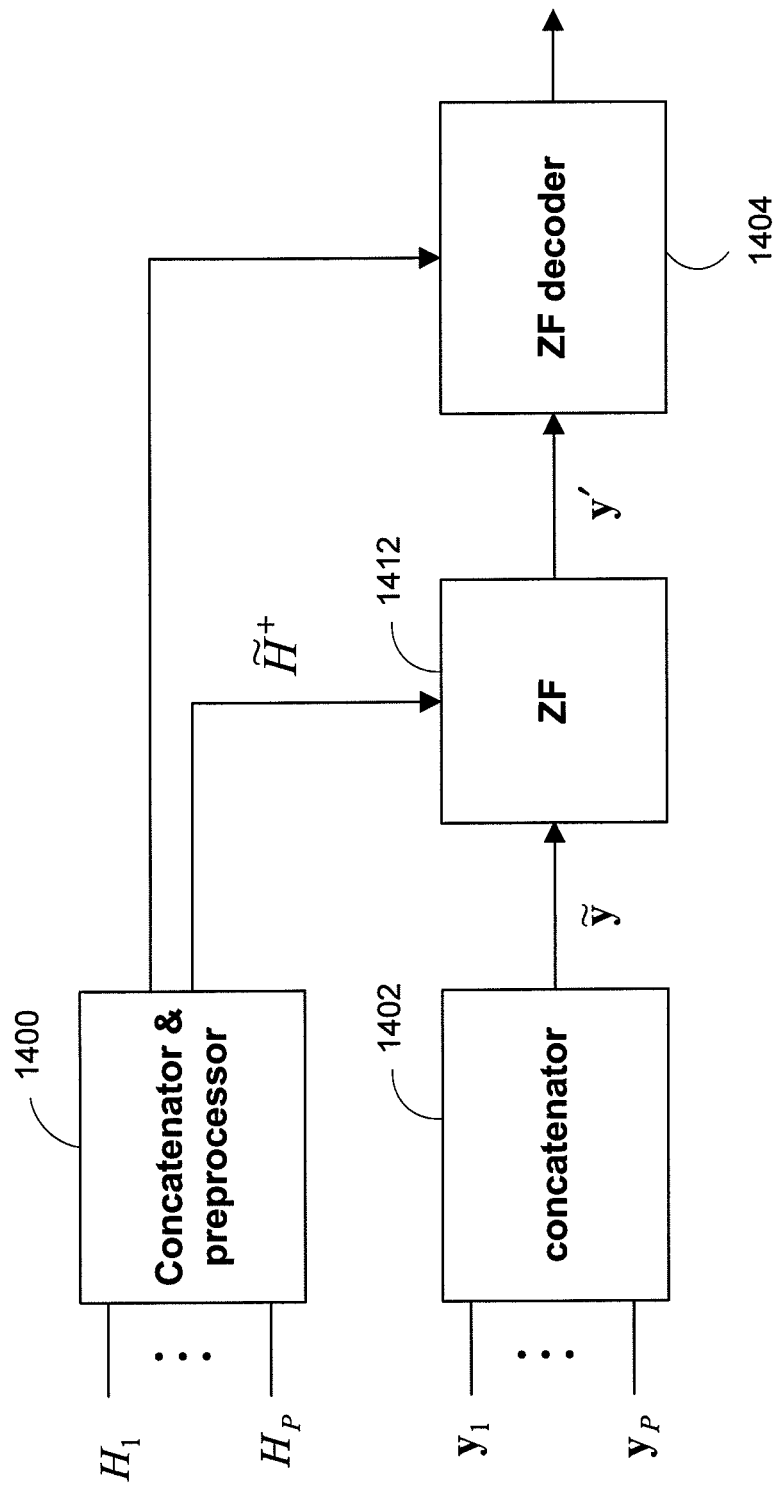

Rather than combining the P received signal vectors by weighted addition, combiner 1402 in FIG. 14 may concatenate the received signal vectors into an $NN_r$-dimensional combined signal vector, $\tilde{y}$. Similarly, combiner 1400 may concatenate the channel matrices into an $NN_r \times N_t$ combined channel matrix, $\tilde{H}$. For system modeling purposes, the noise vectors can also be concatenated into an $NN_r$-dimensional noise vector, $\tilde{n}$. Thus, the combined vectors are $$\tilde{y} = [y_1^T y_2^T \ldots y_N^T]^T \quad (17)$$

$$\tilde{n} = [n_1^T n_2^T \ldots n_N^T]^T \quad (18)$$

$$\tilde{H} = [H_1^T H_2^T \ldots H_N^T]^T, \quad (19)$$

After concatenation, the new channel model for the system may be given by, $$\tilde{y} = \tilde{H}x + \tilde{n}. \quad (20)$$

For clarity, FIG. 12 shows each component of the vectors and matrix in equation (21). Because combiners 1400 and 1402 merely concatenate the matrices and vectors, respectively, without changing their components in any way, there is no loss of information from the combining operations. Therefore, combiners 1400 and 1402 are optimal combiners.

Following concatenation by combiners 1400 and 1402, the combined signal vector, $\tilde{y}$, may be modeled as a single received signal vector affected by a channel response matrix, $\tilde{H}$, and noise components $\tilde{n}$. Thus, the combined signal vector may be equalized using ZF equalizer 1412. As described previously in connection with FIG. 12, ZF equalizer 1412 may process y by multiplying it by the inverse or pseudo-inverse of its channel matrix, $\tilde{H}^+$. Decoder 1404, which decodes the processed signal vector, may calculate an LLR for each bit of the transmitted sequence. Thus, decoder 1404 may implement the decoding metric, $$\frac{|[\tilde{H}_c^\dagger \tilde{y}_c]_k - [x]_k|^2}{[\tilde{H}_c^\dagger \tilde{H}_c^{\dagger*}]_{k,k}}, \quad (21)$$

The decoding metric shown in equation (21) may be derived in substantially the same was as the decoding metric for the MRC-based ZF decoder in FIG. 12, given by equations (9) through (14). Note that equation (21) also includes a weighting factor based on channel information to maximize SNR at this step.

Equation (21), the decoding metric for an optimal linear decoder, is equivalent to the decoding metric for the MRC-based ZF decoder of FIG. 12, reproduced below as equation (22):

$$\frac{|[y']_k - [\hat{x}]_k|^2}{[\tilde{H}^{-1}]_{k,k}} \quad (22)$$

First, as shown by the following sequence of equations, the denominator of equation (21) is equivalent to the denominator of equation (22):

$$[\tilde{H}_c^\dagger \tilde{H}_c^{\dagger*}]_{k,k} = [\{(\tilde{H}_c^* \tilde{H}_c)^{-1} \tilde{H}_c^*\}\{(\tilde{H}_c^* \tilde{H}_c)^{-1} \tilde{H}_c^*\}^*]_{k,k} \quad (23)$$

$$= [\{(\tilde{H}_c^* \tilde{H}_c)^{-1} \tilde{H}_c^* \tilde{H}_c (\tilde{H}_c^* \tilde{H}_c)^{-1}\}]_{k,k} \quad (24)$$

$$= [(\tilde{H}_c^* \tilde{H}_c)^{-1}]_{k,k} \quad (25)$$

$$= \left[\left(\sum_{i=1}^N \tilde{H}_i^* \tilde{H}_i\right)^{-1}\right]_{k,k} \quad (26)$$

$$= [\tilde{H}^{-1}]_{k,k} \quad (27)$$

Equation (23) is given by the definition of the pseudo-inverse. Through mathematical manipulation, equation (23) may be written as equation (26), which, by definition is equal to equation (27), the denominator of the MRC-based ZF decoding metric. Thus, equations (23) through (27) show that the denominators of the two decoding metrics are equivalent.

Similarly, the numerator of the CASL Combining-based ZF decoding metric may be given by, $$|[\tilde{H}_c^\dagger \tilde{y}_c]_k - [x]_k|^2 = |[(\tilde{H}_c^* \tilde{H}_c)^{-1} \tilde{H}_c^* \tilde{y}_c]_k - [x]_k|^2 \quad (28)$$

$$= \left|\left[\left(\sum_{i=1}^N \tilde{H}_i^* \tilde{H}_i\right)^{-1}\left(\sum_{i=1}^N \tilde{H}_i^* y_i\right)\right]_k - [x]_k\right|^2 \quad (29)$$

$$= |[\tilde{H}^{-1} \tilde{y}]_k - [x]_k|^2 \quad (30)$$

$$= |[\tilde{y}]_k - [x]_k|^2. \quad (31)$$

Equation (31) is the denominator of the MRC-based ZF decoding metric. Therefore, $$\frac{|[\tilde{y}]_k - [x]_k|^2}{[\tilde{H}^{-1}]_{k,k}} = \frac{|[\tilde{H}_c^\dagger \tilde{y}_c]_k - [x]_k|^2}{[\tilde{H}_c^\dagger \tilde{H}_c^*]_{k,k}}. \quad (32)$$

Because the CASL Combining ZF decoder clearly decodes a signal vector that has all the information received from the common transmit signal vector, from the equivalence of decoding metrics, the MRC-based decoder of FIGS. 10 and 12 also fully utilizes all of the received information. Using substantially the same technique, the MRC-based MMSE decoder of FIG. 13 may also be shown to have a decoding metric equal to the CASL Combining decoding metric of equation (21). Therefore, the receiver configurations shown in FIGS. 10, 12, and 13 may be optimal linear decoders.

Referring now to FIGS. 16A-16G, various exemplary implementations of the present invention are shown.

Figure 16A:
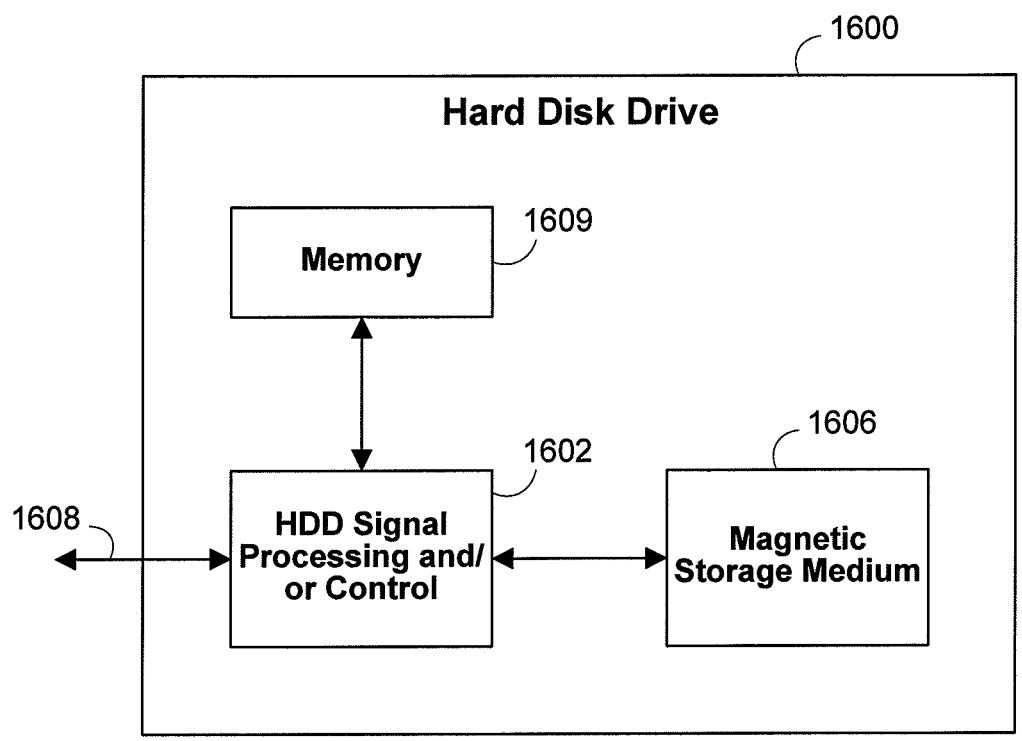
FIG. 16A is a block diagram of an exemplary hard disk drive that can employ the disclosed technology.

Referring now to FIG. 16A, the present invention can be implemented in a hard disk drive 1600. The present invention may implement either or both signal processing and/or control circuits, which are generally identified in FIG. 16A at 1602. In some implementations, the signal processing and/or control circuit 1602 and/or other circuits (not shown) in the HDD 1600 may process data, perform coding and/or encryption, perform calculations, and/or format data that is output to and/or received from a magnetic storage medium 1606.

The HDD 1600 may communicate with a host device (not shown) such as a computer, mobile computing devices such as personal digital assistants, cellular phones, media or MP3 players and the like, and/or other devices via one or more wired or wireless communication links 1608. The HDD 1600 may be connected to memory 1609 such as random access memory (RAM), nonvolatile memory such as flash memory, read only memory (ROM) and/or other suitable electronic data storage.

Figure 16B:
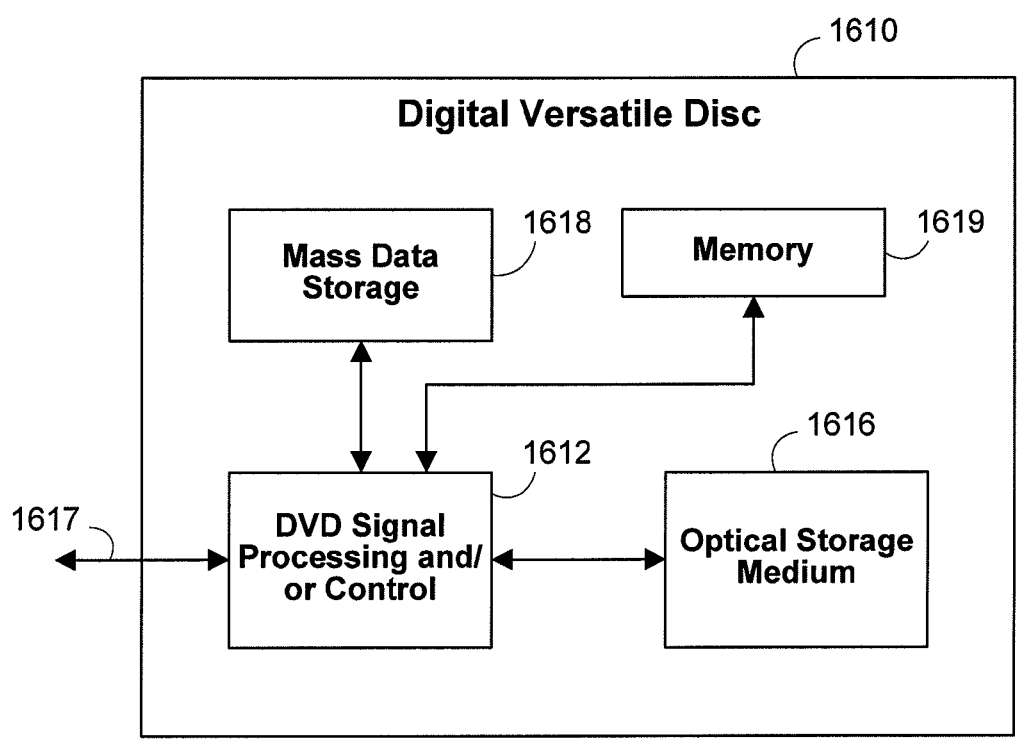
FIG. 16B is a block diagram of an exemplary digital versatile disc that can employ the disclosed technology.

Referring now to FIG. 16B, the present invention can be implemented in a digital versatile disc (DVD) drive 1610. The present invention may implement either or both signal processing and/or control circuits, which are generally identified in FIG. 16B at 1612, and/or mass data storage of the DVD drive 1610. The signal processing and/or control circuit 1612 and/or other circuits (not shown) in the DVD 1610 may process data, perform coding and/or encryption, perform calculations, and/or format data that is read from and/or data written to an optical storage medium 1616. In some implementations, the signal processing and/or control circuit 1612 and/or other circuits (not shown) in the DVD 1610 can also perform other functions such as encoding and/or decoding and/or any other signal processing functions associated with a DVD drive.

The DVD drive 1610 may communicate with an output device (not shown) such as a computer, television or other device via one or more wired or wireless communication links 1617. The DVD 1610 may communicate with mass data storage 1618 that stores data in a nonvolatile manner. The mass data storage 1618 may include a hard disk drive (HDD). The HDD may have the configuration shown in FIG. 16A. The HDD may be a mini HDD that includes one or more platters having a diameter that is smaller than approximately 1.8". The DVD 1610 may be connected to memory 1619 such as RAM, ROM, low latency nonvolatile memory such as flash memory and/or other suitable electronic data storage.

Figure 16C:
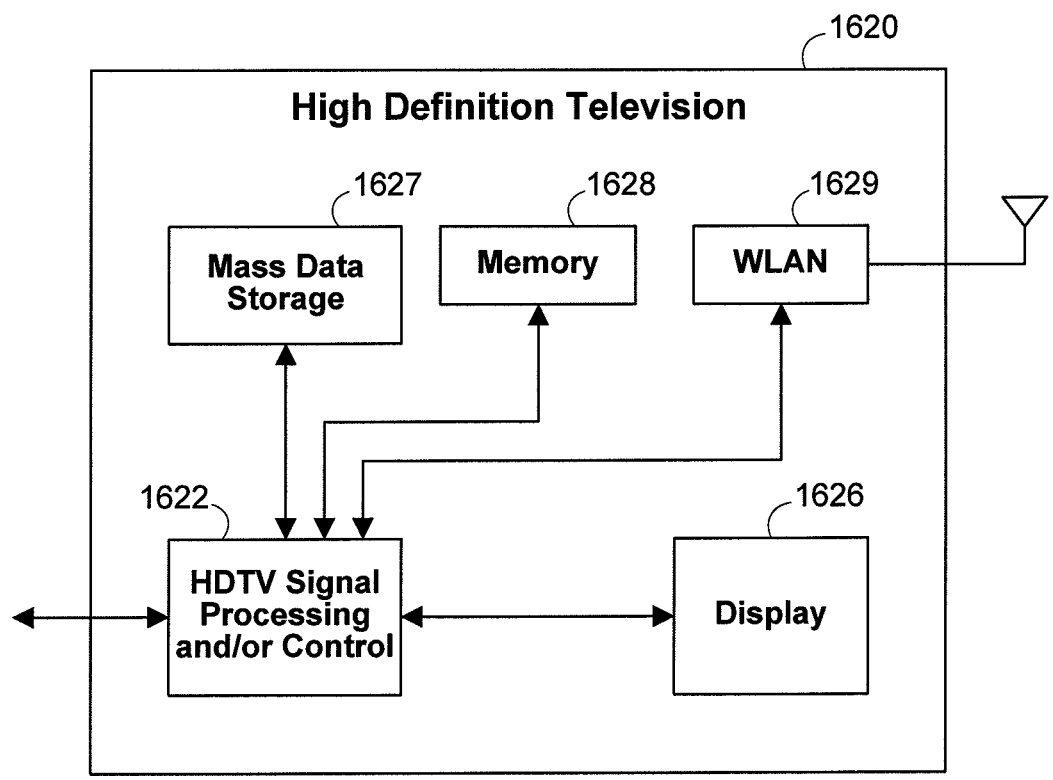
FIG. 16C is a block diagram of an exemplary high definition television that can employ the disclosed technology.

Referring now to FIG. 16C, the present invention can be implemented in a high definition television (HDTV) 1620. The present invention may implement either or both signal processing and/or control circuits, which are generally identified in FIG. 16C at 1622, a WLAN interface 1629 and/or mass data storage 1627 of the HDTV 1620. The HDTV 1620 receives HDTV input signals in either a wired or wireless format and generates HDTV output signals for a display 1626. In some implementations, signal processing circuit and/or control circuit 1622 and/or other circuits (not shown) of the HDTV 1620 may process data, perform coding and/or encryption, perform calculations, format data and/or perform any other type of HDTV processing that may be required.

The HDTV 1620 may communicate with mass data storage 1627 that stores data in a nonvolatile manner such as optical and/or magnetic storage devices, for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The HDTV 1620 may be connected to memory 1628 such as RAM, ROM, nonvolatile memory such as flash memory and/or other suitable electronic data storage. The HDTV 1620 also may support connections with a WLAN via a WLAN network interface 1629.

Figure 16D:
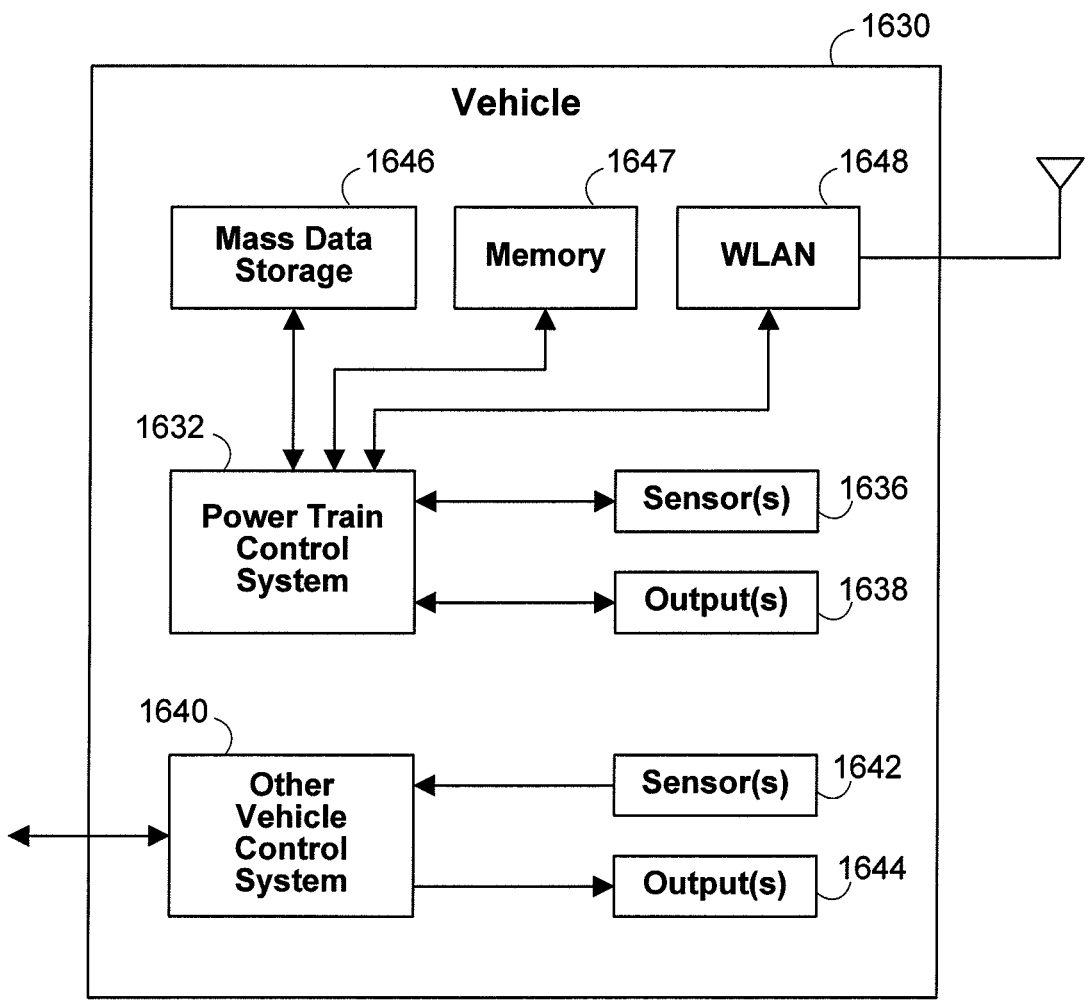
FIG. 16D is a block diagram of an exemplary vehicle that can employ the disclosed technology.

Referring now to FIG. 16D, the present invention implements a control system of a vehicle 1630, a WLAN interface and/or mass data storage of the vehicle control system. In some implementations, the present invention may implement a powertrain control system 1632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1640 of the vehicle 1630. The control system 1640 may likewise receive signals from input sensors 1642 and/or output control signals to one or more output devices 1644. In some implementations, the control system 1640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1632 may communicate with mass data storage 1646 that stores data in a nonvolatile manner. The mass data storage 1046 may include optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The powertrain control system 1632 may be connected to memory 1647 such as RAM, ROM, low latency nonvolatile memory such as flash memory and/or other suitable electronic data storage. The powertrain control system 1632 also may support connections with a WLAN via a WLAN network interface 1648. The control system 1640 may also include mass data storage, memory and/or a WLAN interface (all not shown).

Figure 16E:
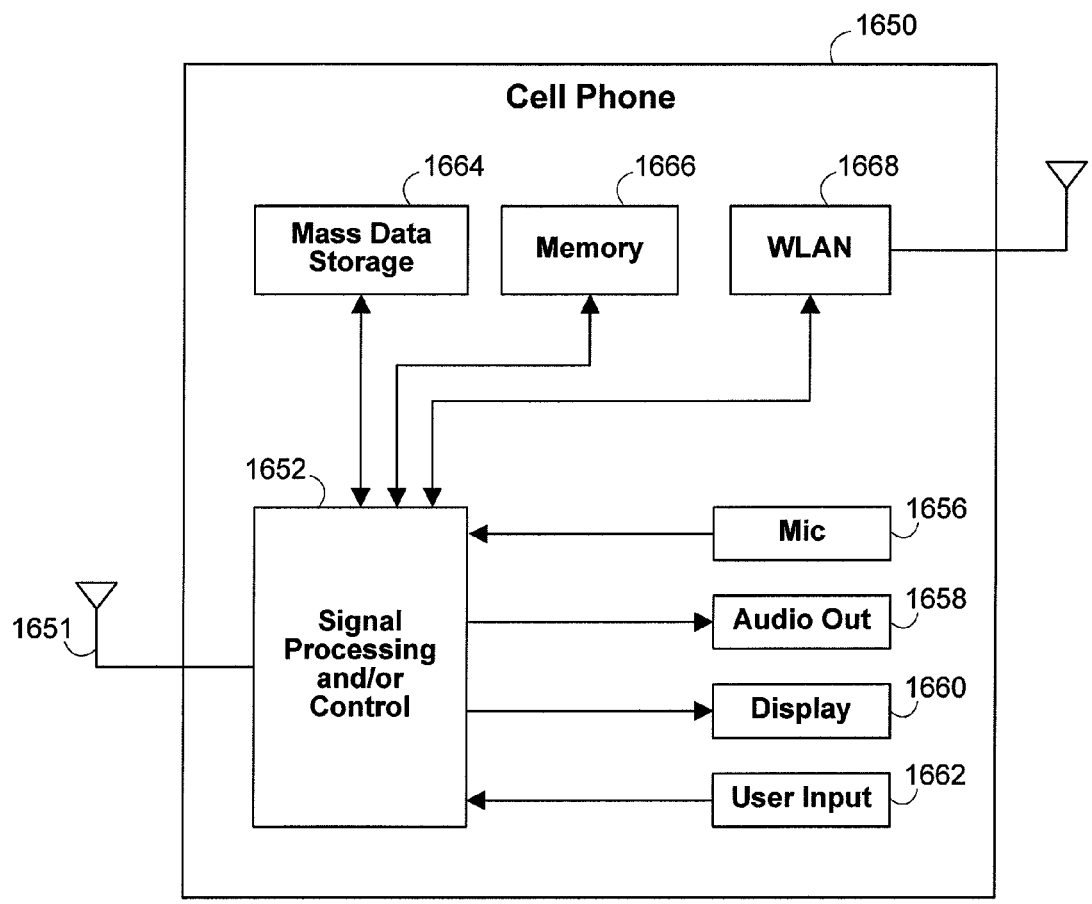
FIG. 16E is a block diagram of an exemplary cell phone that can employ the disclosed technology.

Referring now to FIG. 16E, the present invention can be implemented in a cellular phone 1650 that may include a cellular antenna 1651. The present invention may implement either or both signal processing and/or control circuits, which are generally identified in FIG. 16E at 1652, a WLAN interface 1668 and/or mass data storage 1664 of the cellular phone 1650. In some implementations, the cellular phone 1650 includes a microphone 1656, an audio output 1658 such as a speaker and/or audio output jack, a display 1660 and/or an input device 1662 such as a keypad, pointing device, voice actuation and/or other input device. The signal processing and/or control circuits 1652 and/or other circuits (not shown) in the cellular phone 1650 may process data, perform coding and/or encryption, perform calculations, format data and/or perform other cellular phone functions.

The cellular phone 1650 may communicate with mass data storage 1664 that stores data in a nonvolatile manner such as optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The cellular phone 1650 may be connected to memory 1666 such as RAM, ROM, nonvolatile memory such as flash memory and/or other suitable electronic data storage. The cellular phone 1650 also may support connections with a WLAN via a WLAN network interface 1668.

Figure 16F:
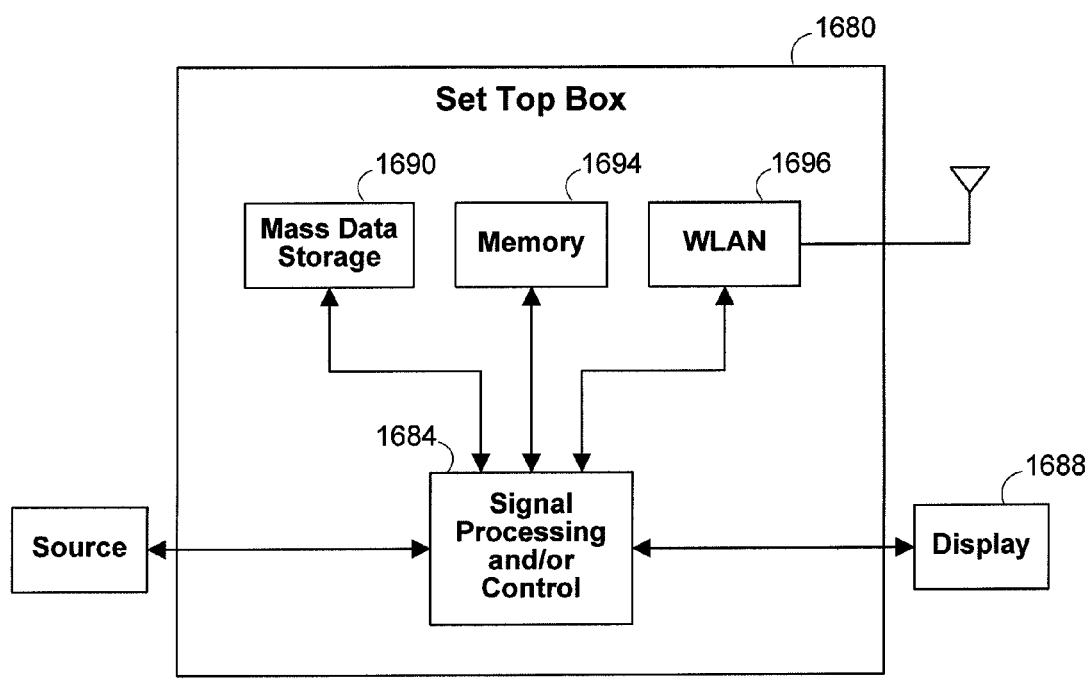
FIG. 16F is a block diagram of an exemplary set top box that can employ the disclosed technology.

Referring now to FIG. 16F, the present invention can be implemented in a set top box 1680. The present invention may implement either or both signal processing and/or control circuits, which are generally identified in FIG. 16F at 1684, a WLAN interface 1696 and/or mass data storage 1690 of the set top box 1680. The set top box 1680 receives signals from a source such as a broadband source and outputs standard and/or high definition audio/video signals suitable for a display 1688 such as a television and/or monitor and/or other video and/or audio output devices. The signal processing and/or control circuits 1684 and/or other circuits (not shown) of the set top box 1680 may process data, perform coding and/or encryption, perform calculations, format data and/or perform any other set top box function.

The set top box 1680 may communicate with mass data storage 1690 that stores data in a nonvolatile manner. The mass data storage 1690 may include optical and/or magnetic storage devices, for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The set top box 1680 may be connected to memory 1694 such as RAM, ROM, nonvolatile memory such as flash memory and/or other suitable electronic data storage. The set top box 1680 also may support connections with a WLAN via a WLAN network interface 1696.

Figure 16G:
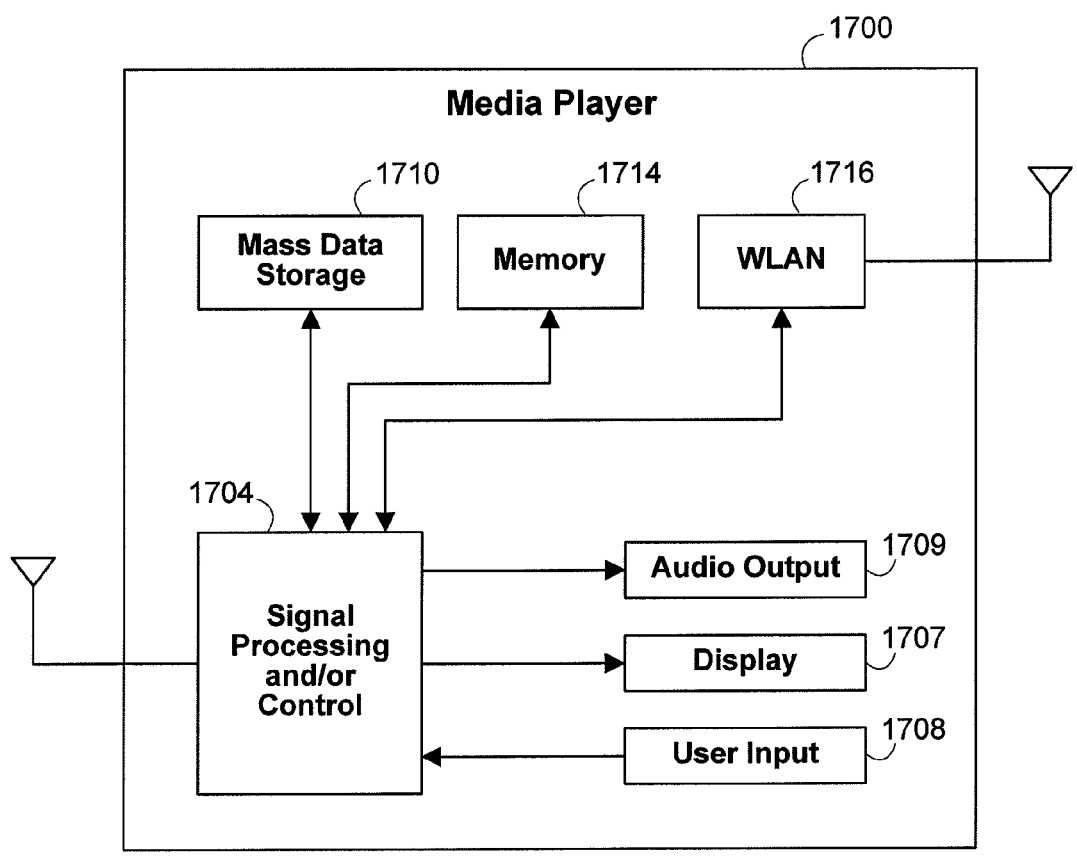
FIG. 16G is a block diagram of an exemplary media player that can employ the disclosed technology.

Referring now to FIG. 16G, the present invention can be implemented in a media player 1760. The present invention may implement either or both signal processing and/or control circuits, which are generally identified in FIG. 16G at 1704, a WLAN interface and/or mass data storage of the media player 1700. In some implementations, the media player 1700 includes a display 1707 and/or a user input 1708 such as a keypad, touchpad and the like. In some implementations, the media player 1700 may employ a graphical user interface (GUI) that typically employs menus, drop down menus, icons and/or a point-and-click interface via the display 1707 and/or user input 1708. The media player 1700 further includes an audio output 1709 such as a speaker and/or audio output jack. The signal processing and/or control circuits 1704 and/or other circuits (not shown) of the media player 1700 may process data, perform coding and/or encryption, perform calculations, format data and/or perform any other media player function.

The media player 1700 may communicate with mass data storage 1710 that stores data such as compressed audio and/or video content in a nonvolatile manner. In some implementations, the compressed audio files include files that are compliant with MP3 format or other suitable compressed audio and/or video formats. The mass data storage 1710 may include optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The media player 1700 may be connected to memory 1714 such as RAM, ROM, nonvolatile memory such as flash memory and/or other suitable electronic data storage. The media player 1700 also may support connections with a WLAN via a WLAN network interface 1716. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method for decoding a signal vector, comprising:
   combining multiple signal vectors into a combined signal vector, wherein each of the multiple signal vectors corresponds to a common signal vector and is associated with a respective one of a plurality of channel response matrices;
   combining the plurality of channel response matrices into a combined channel response matrix;
   equalizing the combined signal vector based on the combined channel response matrix; and
   calculating a decoding metric that includes a term based on a kth component of the equalized combined signal vector and a possible value of a kth component of the common signal vector, the term being scaled by a corresponding k,kth component of the combined channel response matrix.

2. The method of claim 1 further comprising receiving the multiple signal vectors using a retransmission protocol.

3. The method of claim 1 wherein combining the multiple signal vectors comprises combining respective symbols of the multiple signal vectors.

4. The method of claim 1 wherein the multiple signal vectors are combined by weighted addition, wherein the weight for each signal vector, i, is $H^*_i$, the conjugate transpose of an i th channel response matrix.

5. The method of claim 1, wherein combining the plurality of channel response matrices comprises calculating $$\tilde{H} = \sum_{i=1}^{N} H^*_i H_i,$$

where $H_i$ is the channel response matrix corresponding to an ith signal vector.

6. The method of claim 1, further comprising preprocessing the combined channel response matrix, wherein preprocessing comprises determining $\tilde{H}^{-1}$ where $\tilde{H}$ is the combined channel response matrix.

7. The method of claim 1, further comprising preprocessing the combined channel response matrix, wherein preprocessing comprises determining $p(p\tilde{H}+N_0I)^{-1}$, where p includes equalizer tap weights, $\tilde{H}$ is the combined channel response matrix, $N_0$ is a power spectral density of noise associated with the multiple signal vectors, and I is an identity matrix.

8. The method of claim 1, wherein equalizing the combined signal vector comprises zero-forcing equalization, wherein zero-forcing equalization comprises multiplying the combined signal vector by $\tilde{H}^{-1}$, where $\tilde{H}$ is the combined channel response matrix.

9. The method of claim 8, wherein the decoding metric is $$\frac{|[y']_k - [\hat{x}]_k|^2}{[\tilde{H}^{-1}]_{k,k}},$$

where $[y']_k$ is a kth component of the equalized combined signal vector, $\tilde{H}$ is the combined channel response matrix, and $[\hat{x}]_k$ is a possible value of a kth component of the common signal vector.

10. The method of claim 1, wherein equalizing the combined signal vector comprises minimum-mean-squared error (MMSE) equalization, wherein MMSE equalization comprises multiplying the combined signal vector by $p(p\tilde{H}+N_0I)^{-1}$, where p includes equalizer tap weights, $\tilde{H}$ is the combined channel response matrix, $N_0$ is a power spectral density of noise associated with the multiple signal vectors, and I is an identity matrix.

11. A system for decoding a signal vector, comprising:
   a vector combiner for combining multiple signal vectors into a combined signal vector, wherein each of the multiple signal vectors corresponds to a common signal vector and is associated with a respective one of a plurality of channel response matrices;
   a matrix combiner for combining the plurality of channel response matrices into a combined channel response matrix;
   an equalizer for equalizing the combined signal vector based on the combined channel response matrix; and
   a decoder for calculating a decoding metric that includes a term based on a kth component of the equalized combined signal vector and a possible value of a kth component of the common signal vector, the term being scaled by a corresponding k,kth component of the combined channel response matrix.

12. The system of claim 11 further comprising a receiver for receiving the multiple signal vectors using a retransmission protocol.

13. The system of claim 11 wherein the vector combiner combines respective symbols of the multiple signal vectors.

14. The system of claim 11 wherein the multiple signal vectors are combined by weighted addition, wherein the weight for each signal vector, i, is $H^*_i$, the conjugate transpose of an i th channel response matrix.

15. The system of claim 11, wherein the matrix combiner comprises circuitry for calculating $$\tilde{H} = \sum_{i=1}^{N} H_i^* H_i,$$

where $H_i$ is the channel response matrix corresponding to an ith signal vector.

16. The system of claim 11 further comprising a preprocessor for preprocessing the combined channel response matrix, wherein the preprocessor determines $\tilde{H}^{-1}$, where $\tilde{H}$ is the combined channel response matrix.

17. The system of claim 11 further comprising a preprocessor for preprocessing the combined channel response matrix, wherein the preprocessor computes $p(p\tilde{H}+N_0 I)^{-1}$, where p includes equalizer tap weights, $\tilde{H}$ is the combined channel response matrix, $N_0$ is a power spectral density of noise associated with the multiple signal vectors, and I is an identity matrix.

18. The system of claim 11, wherein the equalizer comprises a zero-forcing equalizer, and wherein the zero-forcing equalizer comprises multiplication circuitry for multiplying the combined signal vector by $\tilde{H}^{-1}$, where $\tilde{H}$ is the combined channel response matrix.

19. The system of claim 18, wherein the decoding metric is $$\frac{|[y']_k - [\hat{x}]_k|^2}{[\tilde{H}^{-1}]_{k,k}},$$

where $[y']_k$ is a kth component of the equalized combined signal vector, $\tilde{H}$ is the combined channel response matrix, and $[\hat{x}]_k$ is a possible value of a kth component of the common signal vector.

20. The system of claim 11, wherein the equalizer comprises a minimum-mean-squared error (MMSE) equalizer, and wherein the MMSE equalizer comprises multiplication circuitry for multiplying the combined signal vector by $p(p\tilde{H}+N_0 I)^{-1}$, where p includes equalizer tap weights, $\tilde{H}$ is the combined channel response matrix, $N_0$ is a power spectral density of noise associated with the multiple signal vectors, and I is an identity matrix.

\* \* \* \* \*